(12) United States Patent
Frank

(10) Patent No.: US 11,514,777 B2
(45) Date of Patent: Nov. 29, 2022

(54) METHODS AND DEVICES FOR TRANSFERRING DATA USING SOUND SIGNALS

(71) Applicant: Sonos, Inc., Santa Barbara, CA (US)

(72) Inventor: Eric Frank, Philadelphia, PA (US)

(73) Assignee: Sonos, Inc., Santa Barbara, CA (US)

( * ) Notice: Subject to any disclaimer, the term of this patent is extended or adjusted under 35 U.S.C. 154(b) by 509 days.

(21) Appl. No.: 16/150,060

(22) Filed: Oct. 2, 2018

(65) Prior Publication Data

US 2020/0105128 A1 Apr. 2, 2020

(51) Int. Cl.
*G08C 23/02* (2006.01)
*H04B 11/00* (2006.01)
*H04L 27/34* (2006.01)

(52) U.S. Cl.
CPC ............ *G08C 23/02* (2013.01); *H04B 11/00* (2013.01); *H04L 27/34* (2013.01)

(58) Field of Classification Search
None
See application file for complete search history.

(56) References Cited

U.S. PATENT DOCUMENTS

| | | | |
|---|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,383,297 B1 | 6/2008 | Atsmon et al. |
| 7,391,791 B2 | 6/2008 | Balassanian et al. |

(Continued)

FOREIGN PATENT DOCUMENTS

CN 106919295 A 7/2017
CN 207070285 U 3/2018

(Continued)

OTHER PUBLICATIONS

AudioTron Quick Start Guide, Version 1.0, Mar. 2001, 24 pages.

(Continued)

*Primary Examiner* — Hovhannes Baghdasaryan
(74) *Attorney, Agent, or Firm* — Fortem IP; Anthony Johnson

(57) ABSTRACT

A method of transmitting data comprises modulating data symbols for transmission onto a sonic carrier signal and transmitting the modulated data using an electroacoustic transducer. The modulated data is transmitted by transmitting a portion of the modulated data for a first duration; pausing transmission for a second duration; and repeating the transmitting and pausing with further portions of the modulated data.

17 Claims, 18 Drawing Sheets

(56) References Cited

U.S. PATENT DOCUMENTS

| | | | |
|---|---|---|---|
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington et al. |
| 8,483,853 | B1 | 7/2013 | Lambourne |
| 8,942,252 | B2 | 1/2015 | Balassanian et al. |
| 9,979,560 | B2* | 5/2018 | Kim ............... H04L 12/2836 |
| 2001/0008499 | A1* | 7/2001 | Ko ........................ G08C 23/02 367/2 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0151977 | A1* | 8/2003 | Shah ..................... E21B 47/13 367/82 |
| 2003/0157951 | A1 | 8/2003 | Hasty |
| 2004/0024478 | A1 | 2/2004 | Hans et al. |
| 2004/0240567 | A1* | 12/2004 | Akita ................. H04L 25/063 375/259 |
| 2005/0100117 | A1* | 5/2005 | Jensen ................ H04L 27/10 375/340 |
| 2006/0136544 | A1* | 6/2006 | Atsmon ................ A63H 3/28 709/200 |
| 2007/0142944 | A1 | 6/2007 | Goldberg et al. |
| 2007/0254604 | A1* | 11/2007 | Kim ..................... H04B 11/00 455/88 |
| 2008/0304362 | A1* | 12/2008 | Fleming ............... H04B 13/02 367/134 |
| 2010/0110273 | A1* | 5/2010 | Turbahn .............. G01S 11/14 348/348 |
| 2012/0087662 | A1* | 4/2012 | Suzuki ................ H04J 3/1694 398/66 |
| 2014/0209313 | A1* | 7/2014 | Froelich .............. E21B 47/16 166/335 |
| 2015/0318874 | A1* | 11/2015 | Donaldson .............. H04W 4/80 367/135 |
| 2017/0149522 | A1* | 5/2017 | Passerieux ........... H04B 11/00 |
| 2018/0160235 | A1 | 6/2018 | Lesso et al. |
| 2018/0252796 | A1* | 9/2018 | Qu ........................ H04R 1/40 |

FOREIGN PATENT DOCUMENTS

| | | |
|---|---|---|
| CN | 108600885 A | 9/2018 |
| EP | 1389853 A1 | 2/2004 |
| WO | 200153994 | 7/2001 |
| WO | 2003093950 A2 | 11/2003 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
International Bureau, International Search Report and Written Opinion dated Jan. 3, 2020, issued in connection with International Application No. PCT/US2019054332, filed on Oct. 2, 2019, 13 pages.
First Office Action dated Aug. 10, 2022; Chinese Patent Application No. 201980078916.X; Applicant: Sonos, Inc.; 19 pages.

* cited by examiner

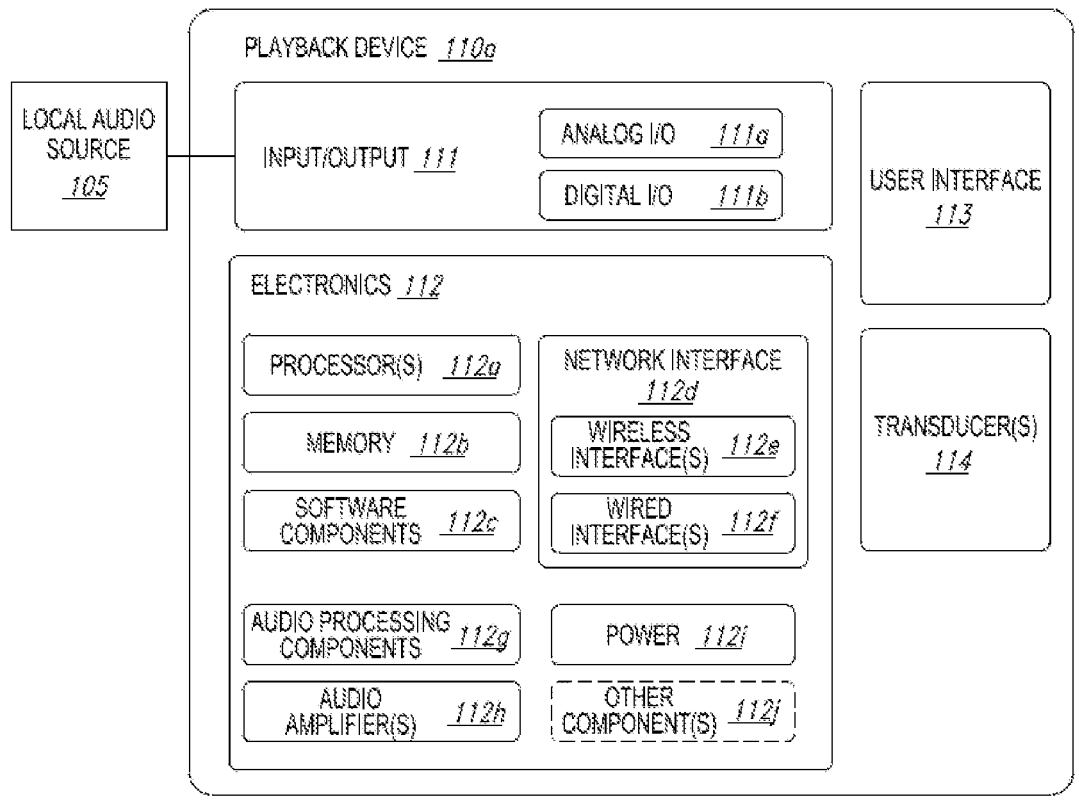
Fig. 1C
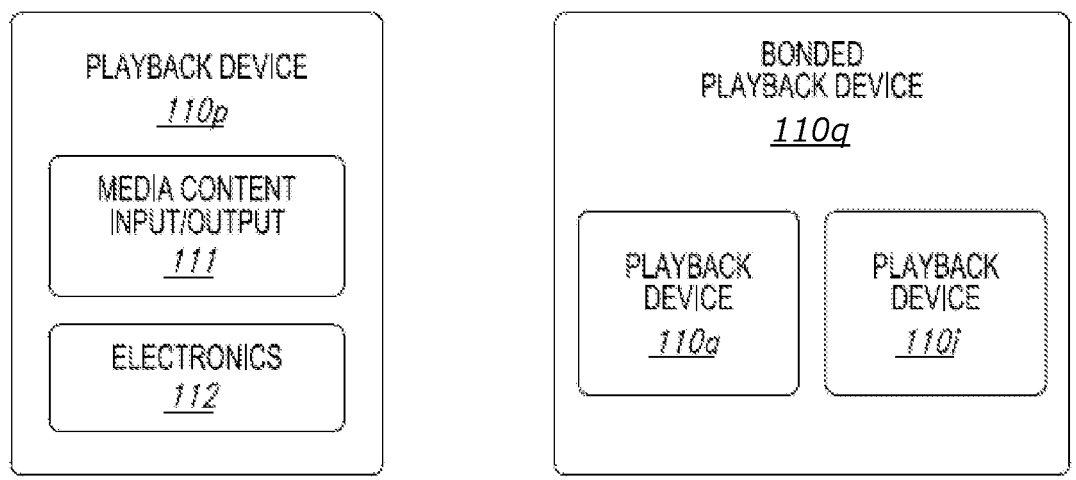
Fig. 1D  Fig. 1E

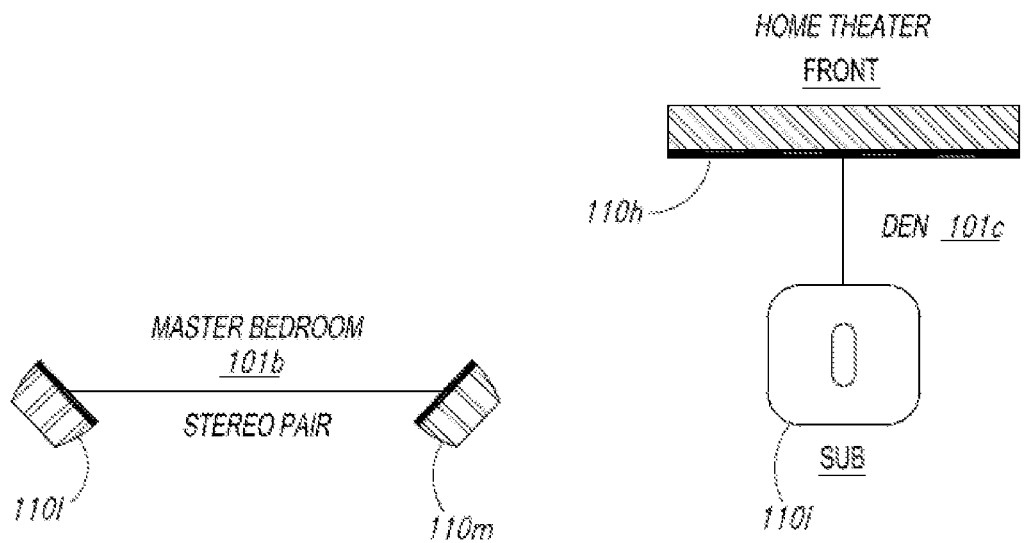
Fig. 1I
Fig. 1J
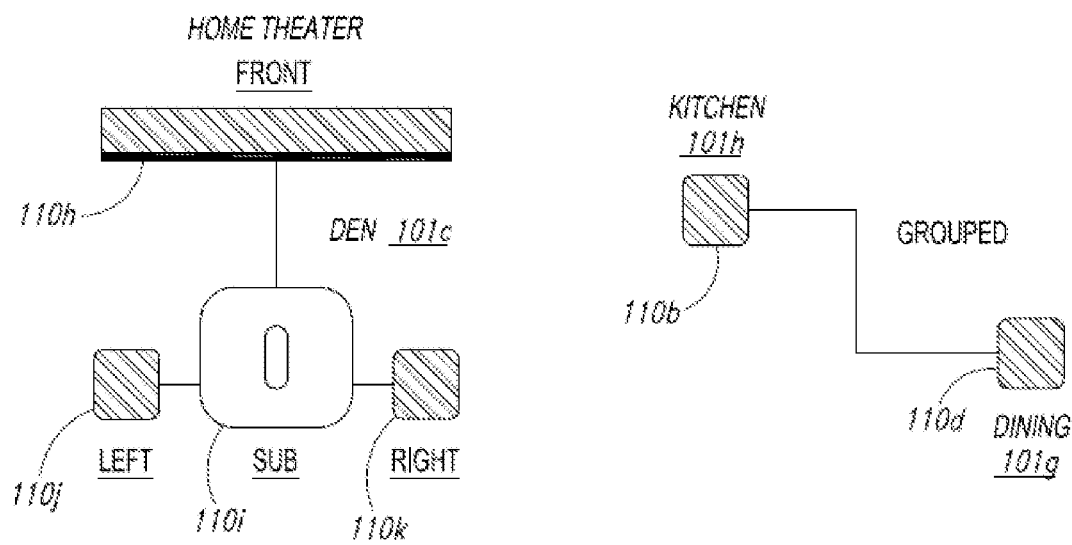
Fig. 1K
Fig. 1L

METHODS AND DEVICES FOR TRANSFERRING DATA USING SOUND SIGNALS

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1C is a block diagram of a playback device.

FIG. 1D is a block diagram of a playback device.

FIG. 1E is a block diagram of a network microphone device.

FIGS. 1-I through 1L are schematic diagrams of corresponding media playback system zones.

Figure 1A:
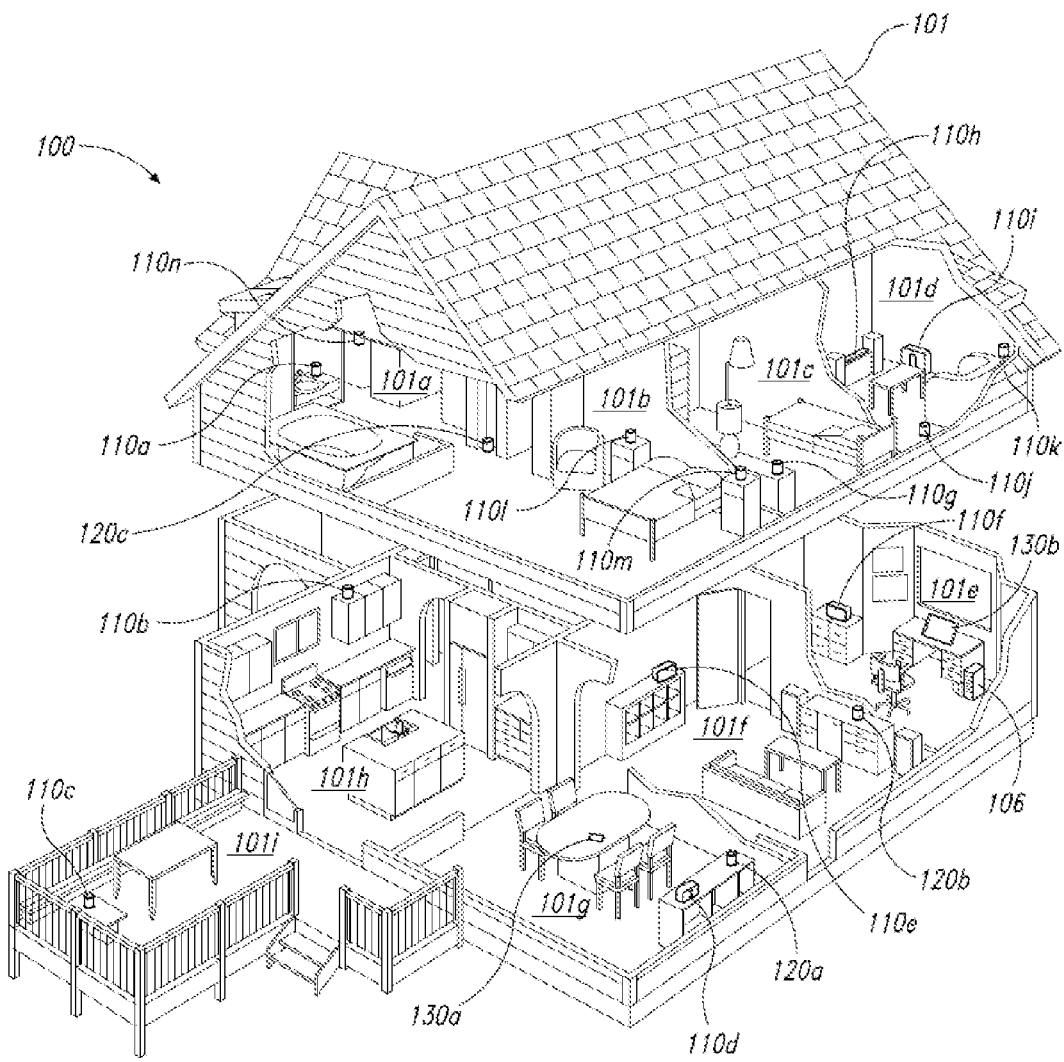
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to the transmission of data using sound signals and to improving the reliability and/or robustness with which such data can be transmitted. This may be beneficial when data is transmitted by sound signals using hardware which is designed to transmit audio signals as its primary purpose.

In some embodiments, for example, a method includes encoding a block of data into a plurality of symbols to be transmitted, modulating the symbols onto a sonic carrier signal, and transmitting the modulated data. Transmitting the modulated data involves transmitting a portion the modulated data for a first duration, pausing transmission for a second duration, and repeating the transmitting and pausing with further portions of the modulated data.

By including a pause in the transmission, transmission of data using an audio transducer may be made more reliable or robust. It has been found that audio transducers may overheat or otherwise not perform optimally when used for data transmission rather than audio transmission. The pause in transmission reduces this effect and can improve the quality of the transmitted data.

In some embodiments, a method includes receiving sound by a microphone, the received sound comprising a block of data modulated on an intermittent sonic carrier signal. The method includes sampling the received signal to generate a sampled data stream, and demodulating the sampled data stream. Demodulating the sampled data stream involves demodulating a portion of the sampled data stream corresponding to a first duration in which the intermittent sonic carrier signal is present, disregarding a portion of the sampled data stream corresponding to a second duration in which the intermittent sonic carrier signal is not present, and repeating the steps of demodulating and disregarding to demodulate further portions of the sampled data stream.

In some embodiments, a method of transferring data between a transmitting device and a receiving device includes the transmitting device encoding a block of data into a plurality of symbols to be transmitted, modulating the symbols onto a sonic carrier signal, and transmitting the modulated data. Transmitting the modulated data involves transmitting a portion the modulated data for a first duration, pausing transmission for a second duration, and repeating the transmitting and pausing with further portions of the modulated data. The method further includes a receiving device receiving the transmitted data using a microphone to generate a received signal, sampling the received signal to generate a sampled data stream, and demodulating the sampled data stream. Demodulating the sampled data stream involves demodulating a portion of the sampled data stream corresponding to the first duration, disregarding a portion of the sampled data stream corresponding to the second duration, and repeating the steps of demodulating and disregarding to demodulate further portions of the sampled data stream.

In some embodiments, a playback device includes an electroacoustic transducer for generating audio signals, non-transitory storage comprising program code, and a processing system. The program code, when executed by the processing system, causes the playback device to encode a block of data to be transmitted into a plurality of symbols to be transmitted, modulate the symbols onto a sonic carrier signal to generate modulated data, and transmit the modulated data using the electroacoustic transducer. Transmitting the modulated data involves transmitting a portion of the modulated data for a first duration, pausing transmission for second duration, and repeating the transmitting and pausing with further portions of modulated data.

In some embodiments, a device includes a microphone configured to receive sound signals, non-transitory storage comprising program code, and a processing system. The program code, when executed by the processing system, causes the device to sample sound received by the microphone to generate a sampled data stream including a block of data modulated on an intermittent sonic carrier signal. The program code then causes the device to demodulate the sampled data stream by demodulating a portion of the sampled data stream corresponding to a first duration in which the intermittent sonic carrier signal is present, disregard a portion of the sampled data stream corresponding to a second duration in which the intermittent sonic carrier signal is not present, and repeat the steps of demodulating and discarding to demodulate further portions of the sampled data stream.

In some embodiments, a system includes one or more playback devices and a receiving device. Each of the one or more playback devices includes an electroacoustic transducer for generating audio signals, non-transitory storage comprising program code, and a processing system. The program code, when executed by the processing system, causes the playback device to encode a block of data to be transmitted into a plurality of symbols to be transmitted, modulate the symbols onto a sonic carrier signal to generate modulated data, and transmit the modulated data using the electroacoustic transducer. Transmitting the modulated data involves transmitting a portion of the modulated data for a first duration, pausing transmission for second duration, and repeating the transmitting and pausing with further portions of modulated data. The receiving device includes a microphone configured to receive sound signals, non-transitory storage comprising program code, and a processing system. The program code, when executed by the processing system, causes the receiving device to receive the data transmitted by the one or more playback devices using a microphone to generate a received signal, sample the received signal to generate a sampled data stream, and demodulate the sampled data stream. Demodulating the sampled data stream involves demodulating a portion of the sampled data stream corresponding to the first duration, disregarding a portion of the sampled data stream corresponding to the second duration, and repeating the steps of demodulating and disregarding to demodulate further portions of the sampled data stream.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1M.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B, 1E, and 1I-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
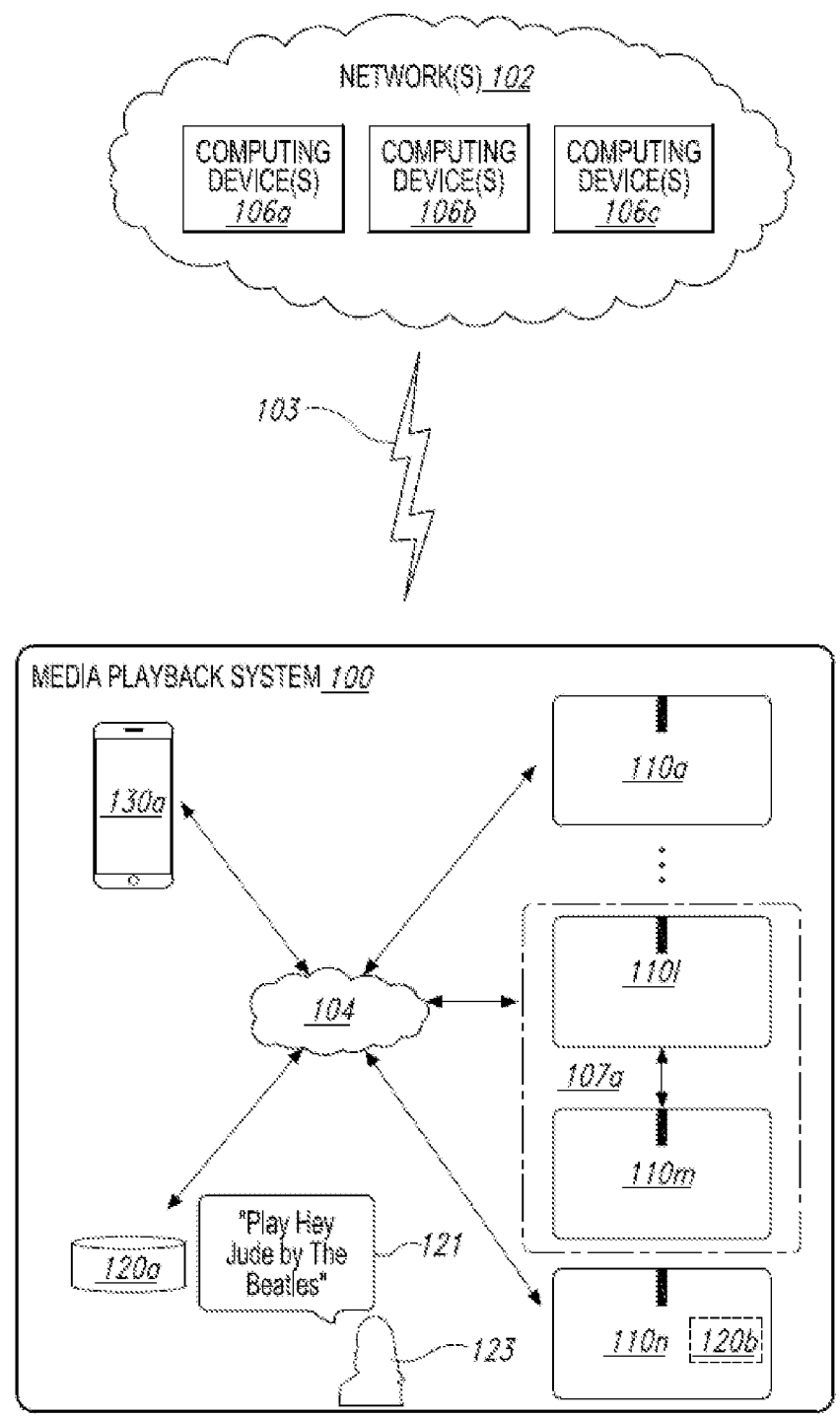
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more) than three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1-I through 1M.

The media playback system 100 includes the NMDs 120*a* and 120*b*, each comprising one or more microphones configured to receive voice utterances from a user. In the illustrated embodiment of FIG. 1B, the NMD 120*a* is a standalone device and the NMD 120*b* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises a High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110*q* includes additional playback devices and/or another bonded playback device. Additional playback device embodiments are described in further detail below with respect to FIGS. 2A-3D.

c. Suitable Network Microphone Devices (NMDs)

Figures 1F, 1G:
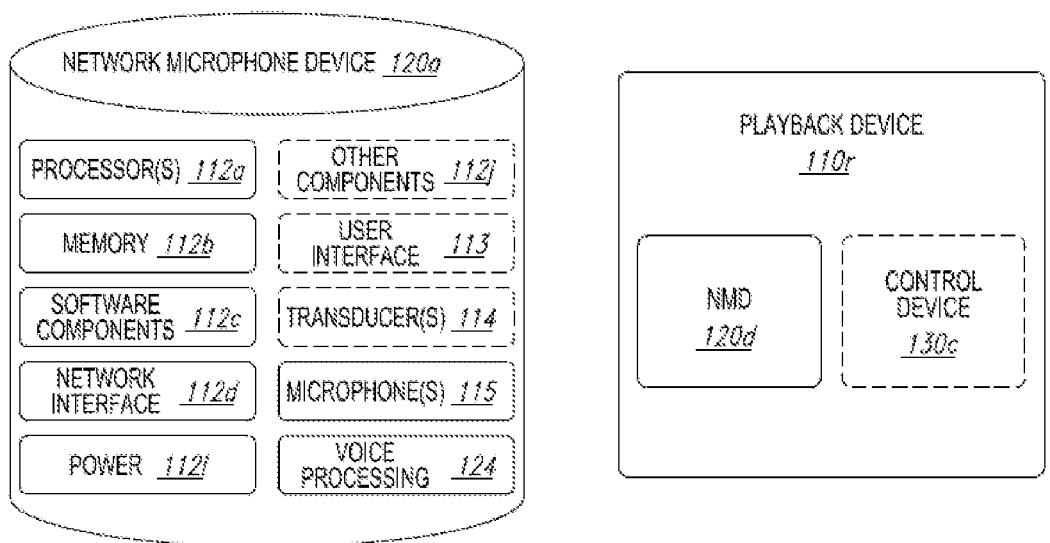
FIG. 1F is a block diagram of a network microphone device.
FIG. 1G is a block diagram of a playback device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the amplifiers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

Figure 1H:
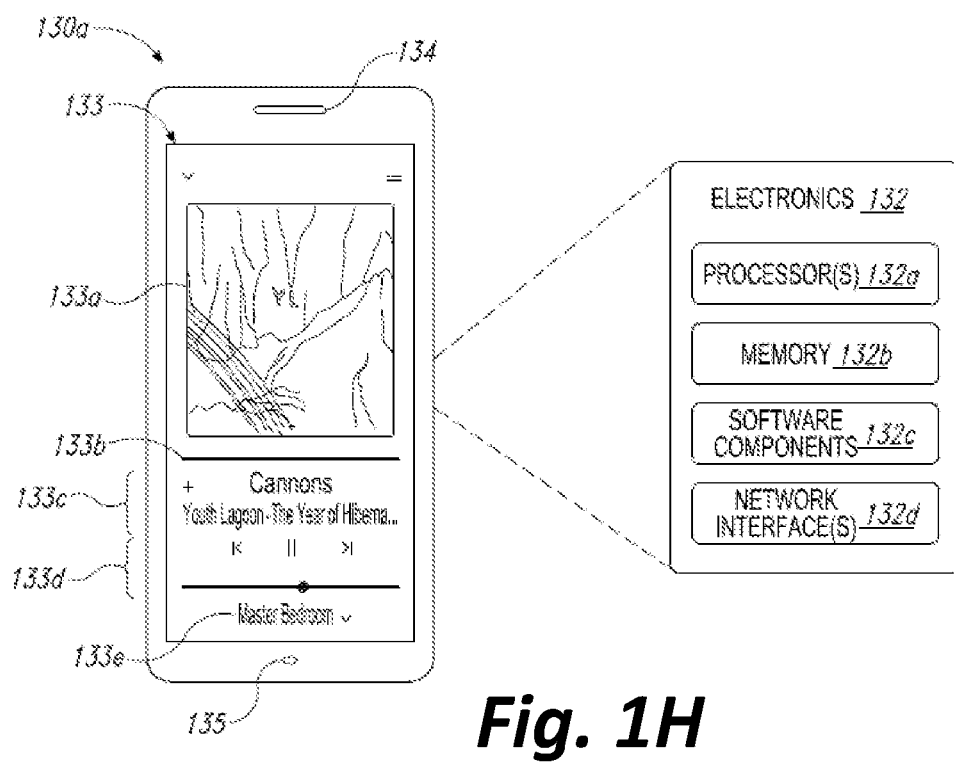
FIG. 1H is a partially schematic diagram of a control device.

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 302 to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

e. Suitable Playback Device Configurations

FIGS. 1-I through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110m (e.g., a right playback device) to form Zone B. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Figure 1M:
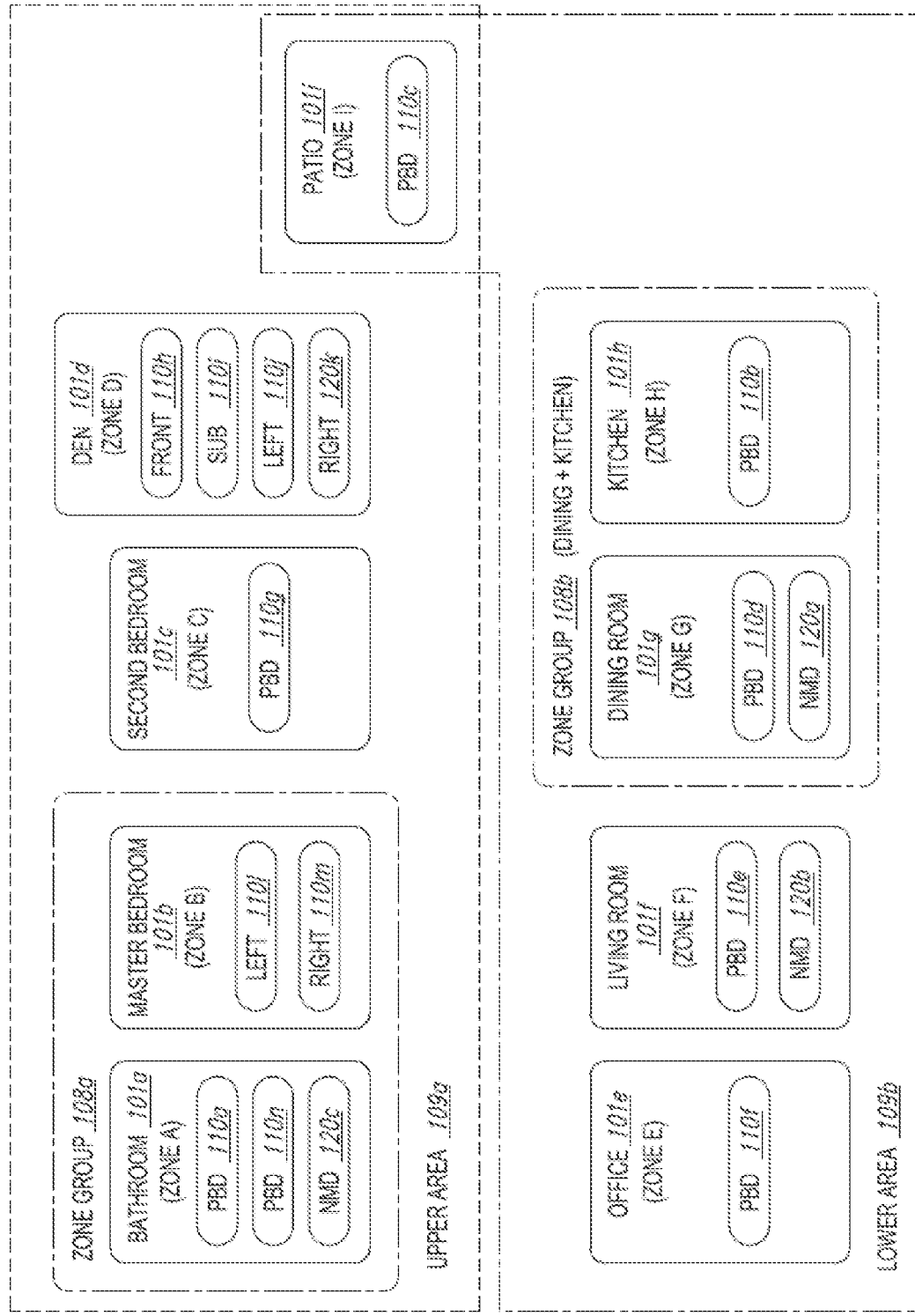
FIG. 1M is a schematic diagram of media playback system areas.

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively. In some implementations, the Right and Left devices 110j and 102k can be configured to form surround or "satellite" channels of a home theater system. The bonded playback devices 110h, 110i, 110j, and 110k may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110a and 110n of the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 1M. In some embodiments, a zone group may be given a unique name selected by a user.

Certain data may be stored in a memory of a playback device (e.g., the memory 112c of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
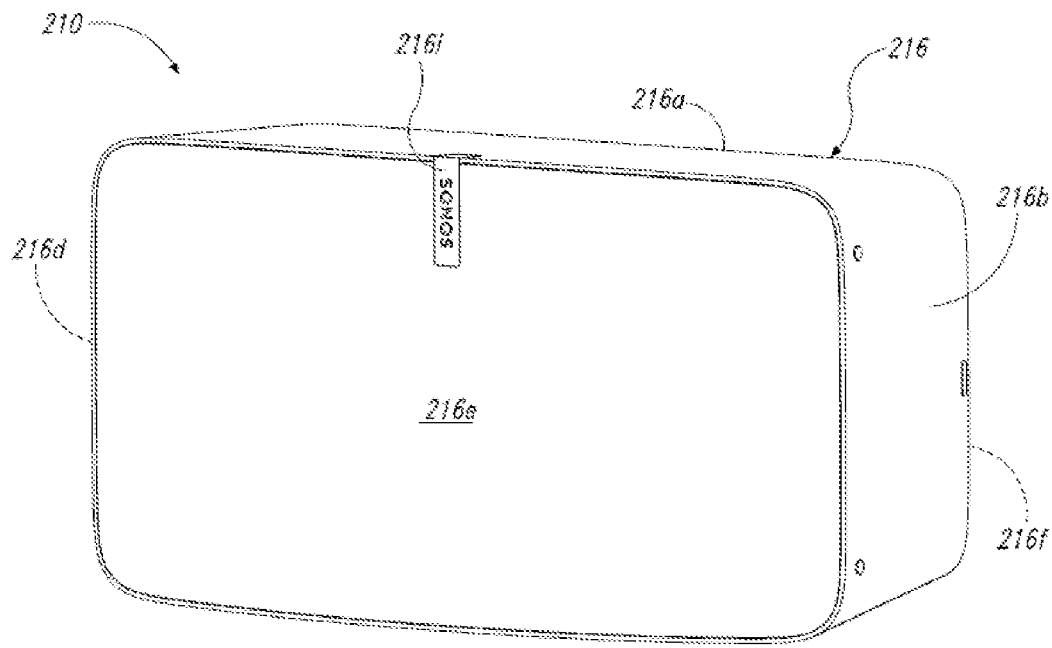
FIG. 2A is a front isometric view of a playback device configured in accordance with aspects of the disclosed technology.
Figure 2B:
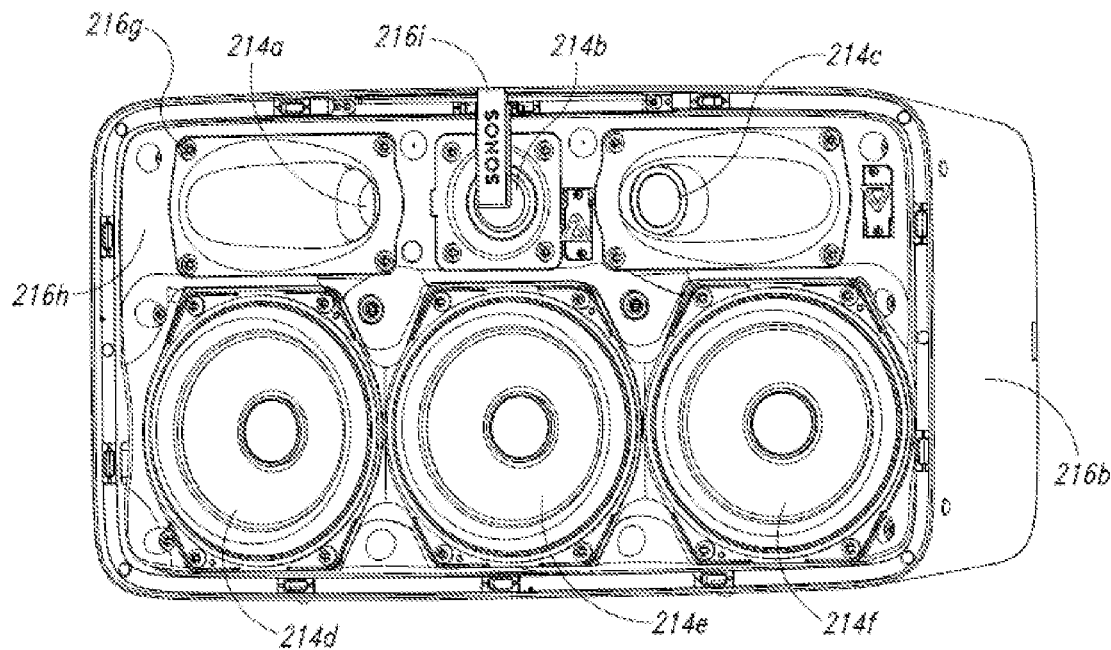
FIG. 2B is a front isometric view of the playback device of FIG. 3A without a grille.
Figure 2C:
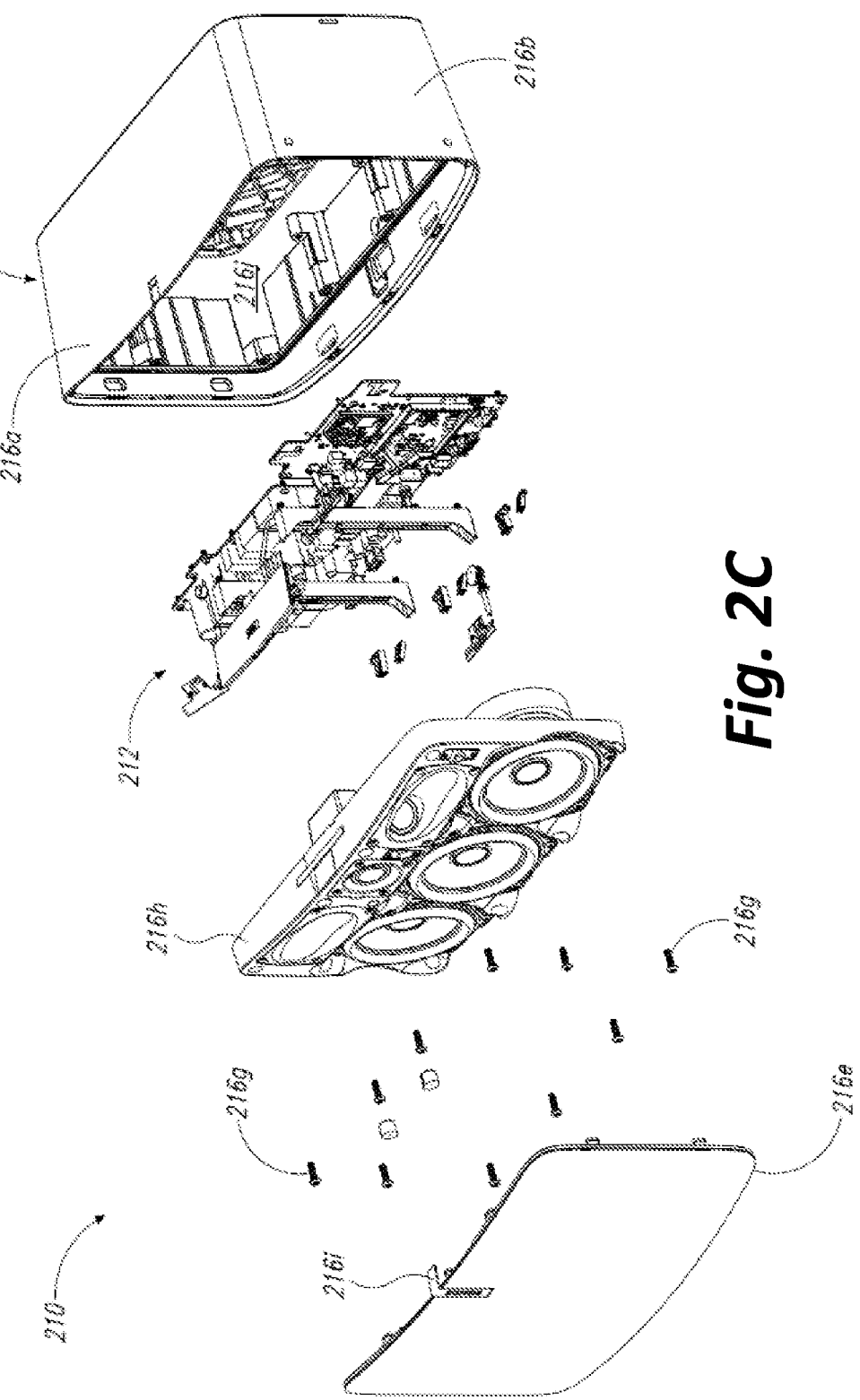
FIG. 2C is an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214*a-c* (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216*i* is axially aligned with the transducer 214*b*. The filter 216*i* can be configured to desirably attenuate a predetermined range of frequencies that the transducer 214*b* outputs to improve sound quality and a perceived sound stage output collectively by the transducers 214. In some embodiments, however, the playback device 210 omits the filter 216*i*. In other embodiments, the playback device 210 includes one or more additional filters aligned with the transducers 214*b* and/or at least another of the transducers 214.

Figure 3A:
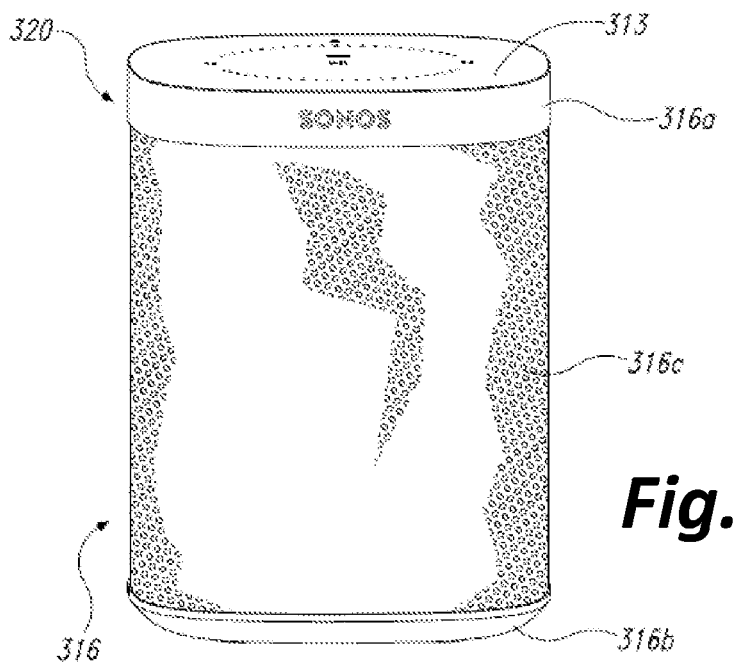
FIG. 3A is a front view of a network microphone device configured in accordance with aspects of the disclosed technology.
Figure 3B:
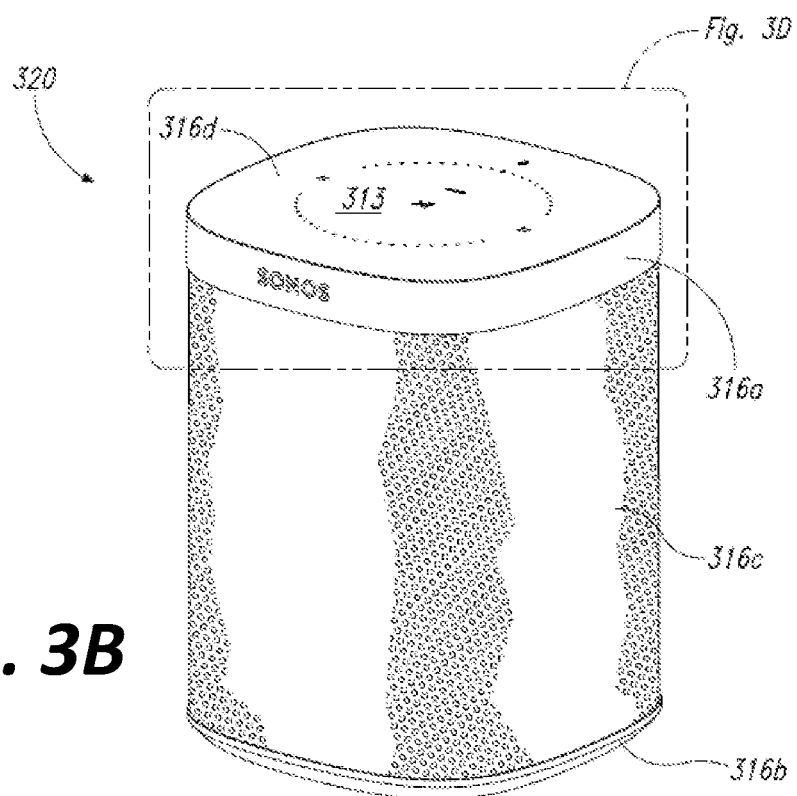
FIG. 3B is a side isometric view of the network microphone device of FIG. 3A.
Figure 3C:
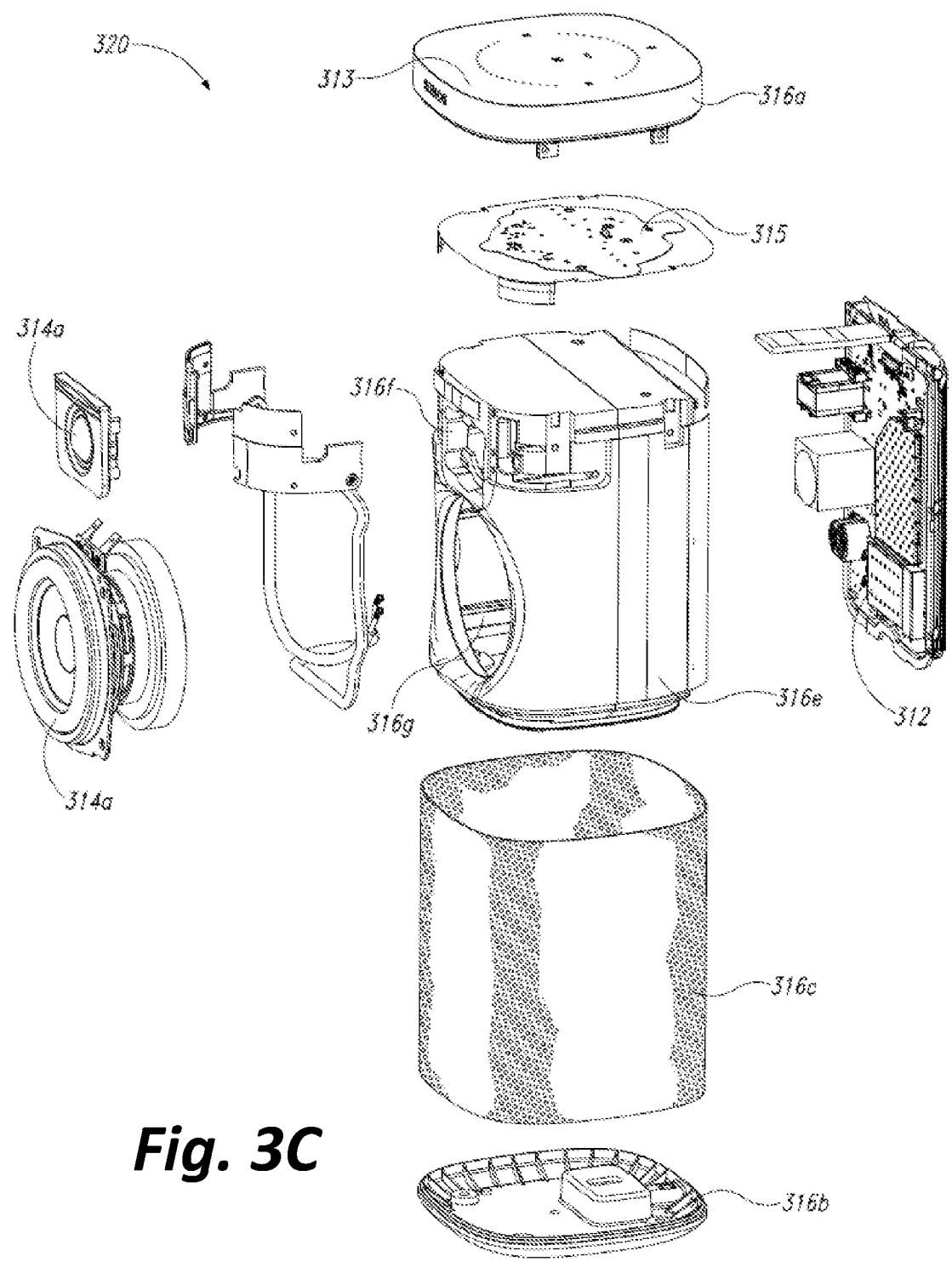
FIG. 3C is an exploded view of the network microphone device of FIGS. 3A and 3B.
Figure 3D:
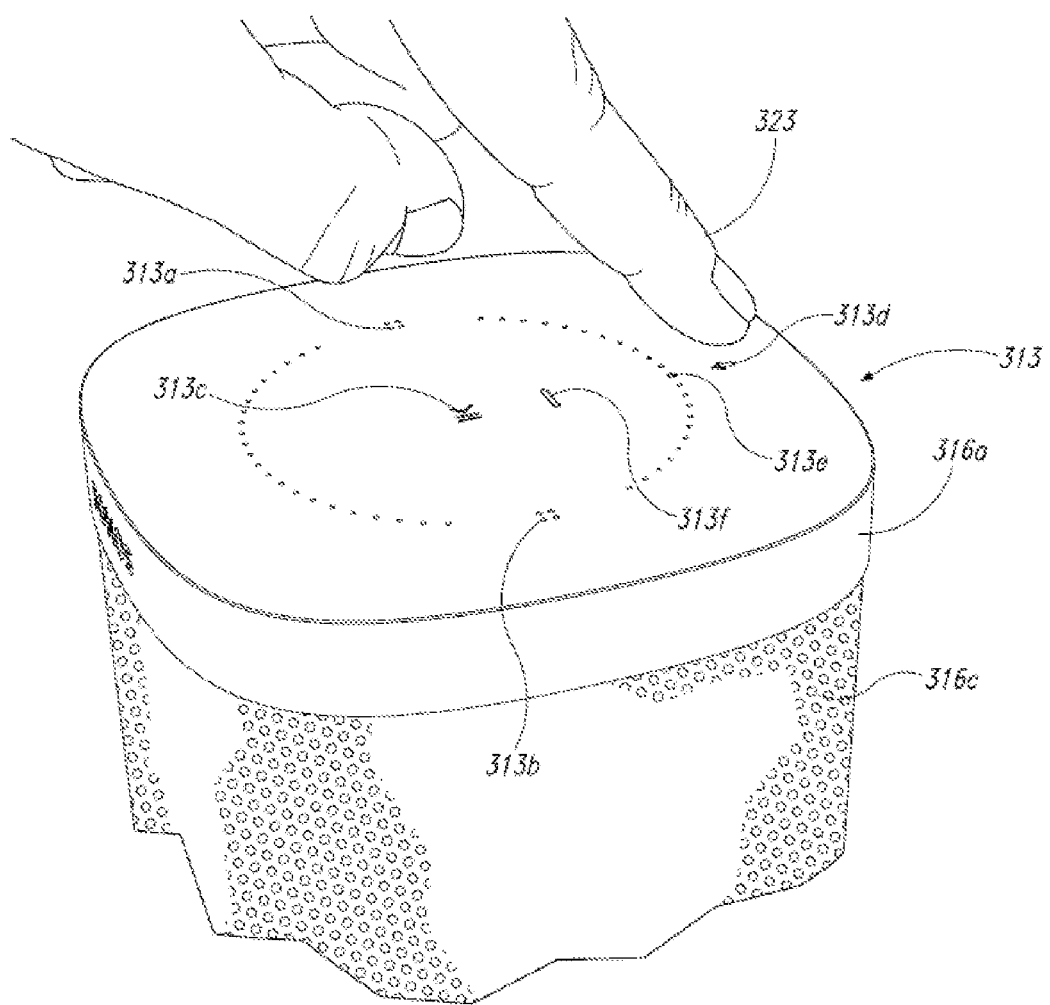
FIG. 3D is an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316*a*, a lower portion 316*b* and an intermediate portion 316*c* (e.g., a grille). A plurality of ports, holes or apertures 316*d* in the upper portion 316*a* allow sound to pass through to one or more microphones 315 (FIG. 3C) positioned within the housing 316. The one or more microphones 315 are configured to received sound via the apertures 316*d* and produce electrical signals based on the received sound. In the illustrated embodiment, a frame 316*e* (FIG. 3C) of the housing 316 surrounds cavities 316*f* and 316*g* configured to house, respectively, a first transducer 314*a* (e.g., a tweeter) and a second transducer 314*b* (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314*a* and 314*b* altogether.

Electronics 312 (FIG. 3C) includes components configured to drive the transducers 314*a* and 314*b*, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112*a*, the memory 112*b*, the software components 112*c*, the network interface 112*d*, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313*a* (e.g., a previous control), a second control surface 313*b* (e.g., a next control), and a third control surface 313*c* (e.g., a play and/or pause control). A fourth control surface 313*d* is configured to receive touch input corresponding to activation and deactivation of the one or microphones 315. A first indicator 313*e* (e.g., one or more light emitting diodes (LEDs) or another suitable illuminator) can be configured to illuminate only when the one or more microphones 315 are activated. A second indicator 313*f* (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313*e*, omitting the second indicator 313*f*. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
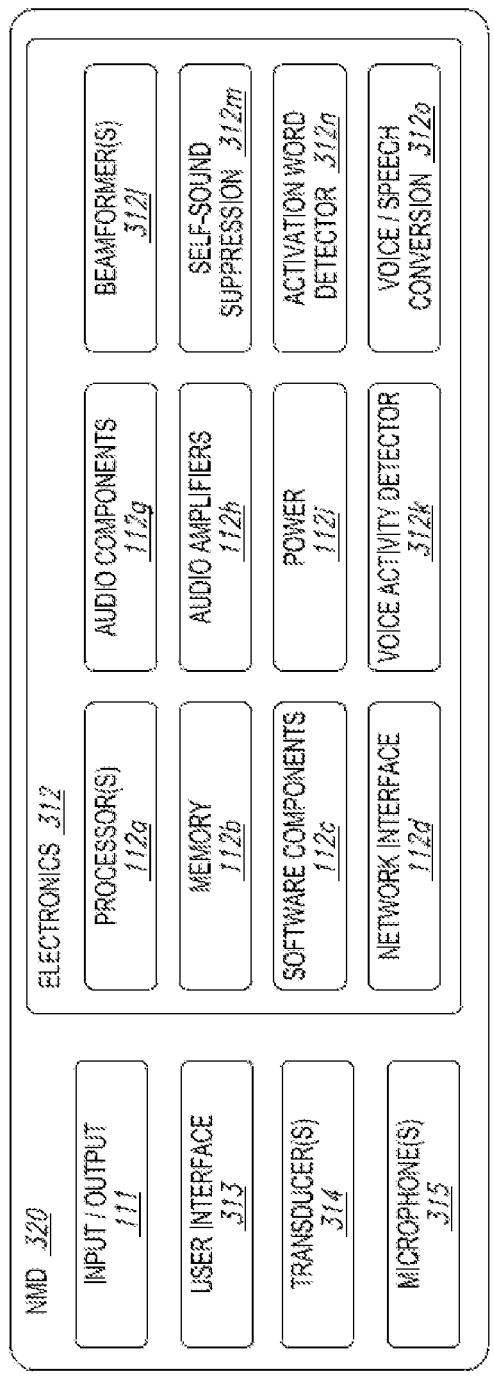
FIG. 3E is a block diagram of the network microphone device of FIGS. 3A-3D

FIG. 3E is a functional block diagram showing additional features of the NMD 320 in accordance with aspects of the disclosure. The NMD 320 includes components configured to facilitate voice command capture including voice activity detector component(s) 312*k*, beam former components 312*l*, acoustic echo cancellation (AEC) and/or self-sound suppression components 312*m*, activation word detector components 312*n*, and voice/speech conversion components 312*o* (e.g., voice-to-text and text-to-voice). In the illustrated embodiment of FIG. 3E, the foregoing components 312*k*-

312o are shown as separate components. In some embodiments, however, one or more of the components 312k-312o are subcomponents of the processors 112a.

The beamforming and self-sound suppression components 312l and 312m are configured to detect an audio signal and determine aspects of voice input represented in the detected audio signal, such as the direction, amplitude, frequency spectrum, etc. The voice activity detector activity components 312k are operably coupled with the beamforming and AEC components 312l and 312m and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise. The activation word detector components 312n are configured to monitor and analyze received audio to determine if any activation words (e.g., wake words) are present in the received audio. The activation word detector components 312n may analyze the received audio using an activation word detection algorithm. If the activation word detector 312n detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312n runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312n may run the received audio through the activation word detection algorithm for each supported voice service in parallel.

The speech/text conversion components 312o may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
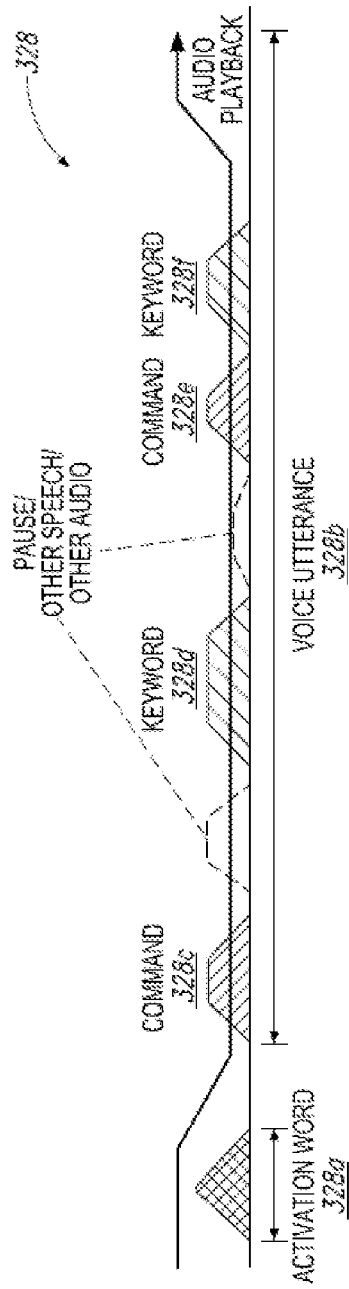
FIG. 3F is a schematic diagram of an example voice input.

FIG. 3F is a schematic diagram of an example voice input 328 captured by the NMD 320 in accordance with aspects of the disclosure. The voice input 328 can include an activation word portion 328a and a voice utterance portion 328b. In some embodiments, the activation word 557a can be a known activation word, such as "Alexa," which is associated with AMAZON's ALEXA®. In other embodiments, however, the voice input 328 may not include an activation word. In some embodiments, a network microphone device may output an audible and/or visible response upon detection of the activation word portion 328a. In addition or alternately, an NMB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 328f). In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

IV. Data Transfer Using Sound Signals

Figure 4:
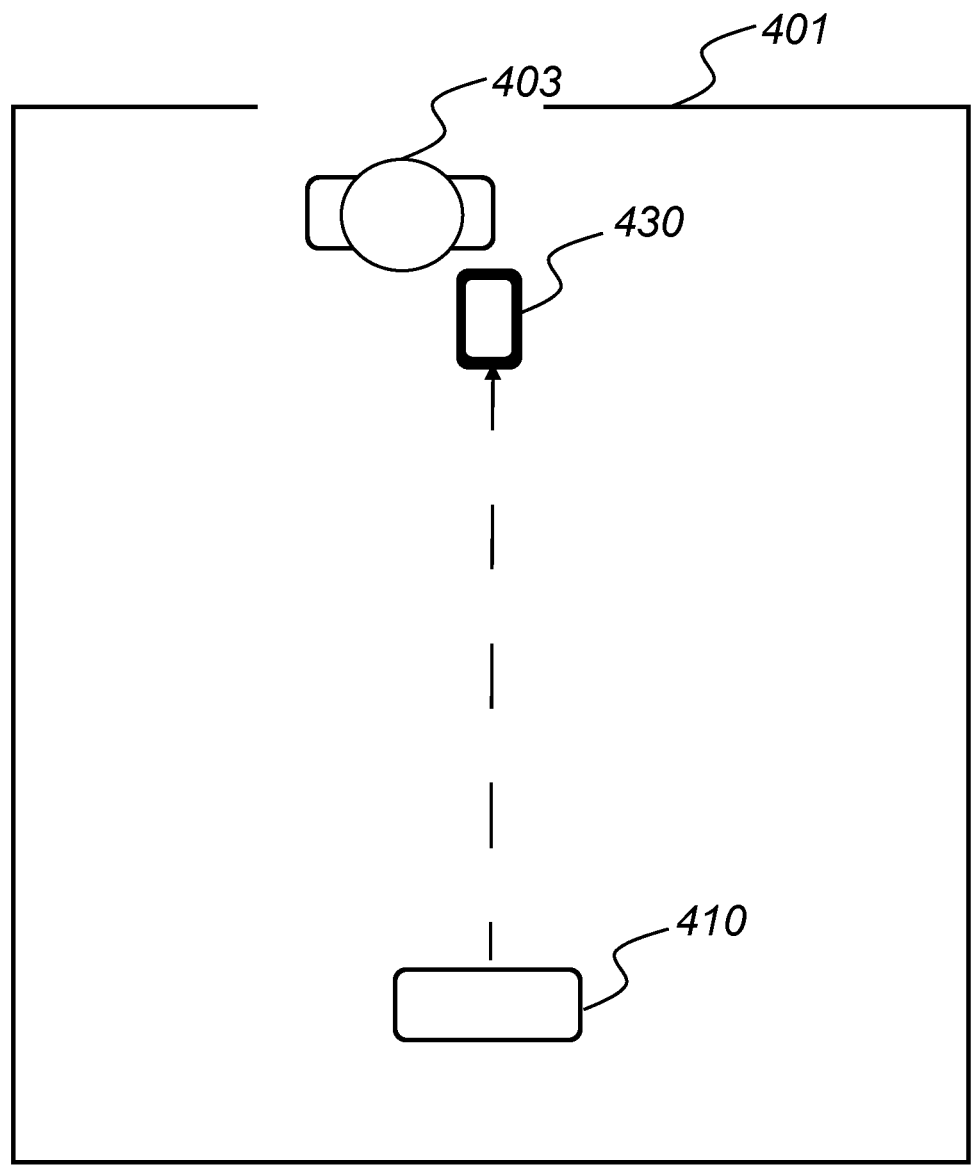
FIG. 4 is a schematic diagram of an environment in which a playback device is arranged to transmit data using sound signals.

FIG. 4 is a diagrammatic representation of an environment in which a playback device 410 is arranged to transmit data using sound signals to another device. The playback device 410 has the same construction as the playback device 110a (FIG. 1C). In particular, the playback device 410 includes at least one transducer for generating sound signals, for example a tweeter for generating relatively high-frequency sound signals, such as sounds with frequencies above about 2 kHz, and/or sounds with frequencies up to about 22 kHz. The playback device 410 is configured to implement a method according to FIG. 5 to transmit data using sound signals to another device. In this example, the another device is a control device 430 which has the same construction as control device 130a (FIG. 1H).

Figure 5:
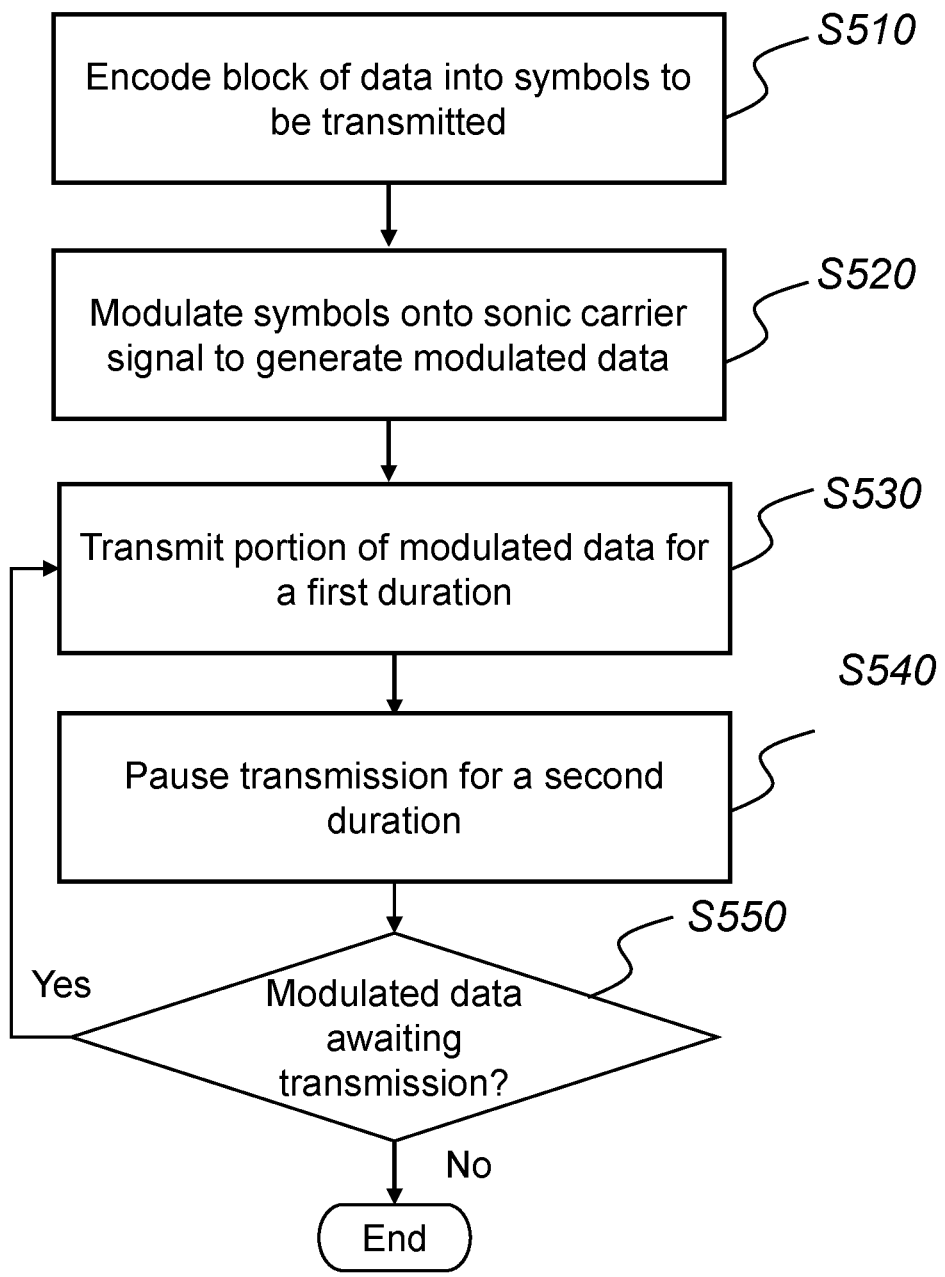
FIG. 5 is a flow chart of a method of transmitting data using sound signals.

FIG. 5 is a flow chart of a method by which data is transmitted using sound signals. The method may, for example, be performed by a playback device such as the playback devices described throughout this disclosure, though the method is more generally applicable and is not limited to being performed by playback devices. The method of FIG. 5 can be applied to the transmission of data using ultrasonic sound signals, using transducers that are primarily designed for transmitting audio sound signals, although can also be applied more generally in the transmission of data using sound signals.

Referring to FIG. 5, a block of data is first encoded, at S510, into a sequence of symbols to be transmitted. A block of data is a portion of digital data for transmission in a message and may have a predetermined fixed length, for example a fixed number of bits, such as 8, 16, 32 or 64 bits, or have an arbitrary length corresponding the length of the data bits to be transmitted in the message. Each symbol corresponds to a predetermined number of bits in the block, for example, 1, 2, 4, 8, 16 or more. Should the number of bits in the message not match an integer number of symbols, padding may be used to expand the block of data to a length corresponding to an integer number of symbols. Any suitable padding method may be used, for example, zero-padding in which zeroes are added to end of the message to give it a length of an integer number of symbols. Similarly, if the data in the message comprises more bits than can fit in one block, the message may be divided over two or more blocks for transmission.

As mentioned above, each symbol to be transmitted represents a predetermined number of bits of data within the data block. The number of bits represented by each symbol depends on the modulation scheme by which the symbols are to be modulated onto a carrier signal.

The symbols to be transmitted are modulated, at S520, onto a sonic carrier signal to generate modulated data. The symbols may be modulated onto the sonic carrier signal using any suitable modulation scheme. Examples of modulation schemes include amplitude-shift keying (ASK), phase-shift keying (PSK), and quadrature amplitude modulation (QAM). In the example of FIG. 4, the playback device 410 modulates symbols onto a sonic carrier wave using 16-QAM, in which each symbol corresponds to four bits of binary data. For other modulation methods, symbols may correspond to more or fewer than four bits.

In the example of FIG. 4, the sonic carrier signal is an ultrasonic carrier signal. An ultrasonic sound signal has a frequency that is higher than the highest frequency of sound that is audible to an average person, for example higher than about 20 kHz. The highest audible sound varies between individuals, so for the purpose of the present disclosure, an ultrasonic sound signal may be considered to have a frequency that remains above about 20 kHz for the duration of the sound signal.

The modulated data is transmitted using a transducer, such as an electroacoustic transducer. In this example, the tweeter of the playback device 410 is operable to generate sound signals having a frequency of between about 2 kHz and about 22 kHz, and therefore can be operated to generate ultrasonic sound signals with a frequency of between about 20 kHz and 22 kHz. Transducers, such as tweeters, may be manufactured to be able to generate sound signals outside the audible range of human hearing in order to reduce detrimental effects associated with roll-off near the extremes of the audible hearing range. However, such transducers may not be primarily designed to transmit ultrasonic signals, and may suffer from detrimental effects when operating near the top end of the operable frequency range, particularly as this range may not be used during audio reproduction (for example 44.1 kHz "CD Quality" PCM sound signals are normally low-pass filtered with cut off of around 20 kHz). The methods described herein may improve at least one of the reliability and robustness of data transmission by such transducers.

The modulated data is transmitted using the ultrasonic transducer by transmitting, at S530, a portion of the modulated data for a first duration. In this example, the first duration corresponds to a duration of one symbol in the modulated data. However, the first duration may in general be any predetermined duration, for example corresponding to a predetermined number of symbols in the modulated data.

After transmission for the first duration, transmission is paused, at S540, for a second duration. In this example, the second duration is the same as the first duration; one symbol length. However, the second duration may in general be a predetermined duration, and may be substantially the same as, or different from, the first duration.

After the pause at S540, at S550 it is determined whether there remains modulated data awaiting transmission, if there is the transmitting and pausing of S530 and S540 is repeated with further portions of the modulated data, until all modulated data for transmission has been transmitted.

Transmission of data using the method of FIG. 5 results in a sonic carrier signal carrying the modulated data which is intermittent, with gaps in which no symbols are transmitted. Pausing the transmission of a sonic carrier signal during data transmission may improve reliability and robustness of data transmission. In examples where ultrasonic signals are generated using an electroacoustic transducer that is primarily designed for transmitting audible sound signals (for example, the tweeter of playback device 410), a significant portion of the electrical energy supplied to the transducer may be converted to thermal energy. This thermal energy may affect the performance of the transducer. For example, thermal energy may increase the temperature of a diaphragm of the transducer, which may cause thermal stress in the diaphragm. This thermal stress may increase the impedance of the transducer, which may affect the operable frequency range of the playback device. Increasing the temperature of components of the transducer may also affect the material properties of components of the transducer (for example, elasticity of the transducer), which may further affect the performance of the transducer. Further still, transmitting sound signals near the edge of operable frequency range of a transducer may cause thermal damage to the transducer. The detrimental effects described above may be most prominent within particular frequency bands, depending on the properties of the transducer. A device may be programmed such that frequency bands associated with the most prominent detrimental effects are avoided.

Transmitting modulated data in portions separated by pauses allows components of the transducer to cool during the gaps in transmission. Allowing the components of the transducer to cool reduces the accumulation of thermal energy, and therefore at least partially mitigates the detrimental effects described above. The duration of the gaps (the second duration described above with reference to FIG. 5) may be based on a characteristic of the electroacoustic transducer transmitting the data. For example, during manufacture or configuration of an electroacoustic transducer, a sufficient duration may be determined for mitigating the detrimental effects described above, and a playback device incorporating the transducer may then be programmed to pause transmission for the determined duration when sending data modulated on a sonic carrier signal. Alternatively, the duration of gaps may be based on characteristics of a device incorporating the electroacoustic transducer, which may include characteristics of one or more transducers of the device, characteristics of the circuitry or other physical components of the device, and/or other characteristics such as the intended use of the device, which may affect the duration, frequency, or other characteristics of data-carrying sound signals that the device is expected to transmit. The duration of gaps may be based on, for example, a product model incorporating the electroacoustic transducer. This may take into account the overall characteristics of the transducers incorporated into that product model. Additionally, or alternatively, the duration of each transmitted portion of modulated data may depend on a characteristic of a particular transducer or device.

As described above for FIG. 5, the gaps are regularly temporally spaced and/or of equal duration (corresponding to the first duration and/or second duration being fixed). In some embodiments the gaps may have different spacings and/or durations, for example having a predetermined sequence of first durations and second durations.

In some embodiments, a playback device may simultaneously perform audio reproduction from a media source and transmit modulated data using sound signals. For example, a playback device may simultaneously perform audio reproduction and transmit the modulated data using ultrasonic sound signals. In some examples, an audio signal and modulated data are simultaneously transmitted by a single electroacoustic transducer. Simultaneously transmitting data and audio signals by a single transducer may cause more thermal energy to be generated than transmitting data alone. A playback device may therefore be configured such that the duration of transmitted portions of modulated data, and/or the duration of pauses between the transmitted portions, depends on whether an audio signal is transmitted simultaneously with the modulated data. For example, a playback device may the duration of the pauses (the second duration) may be longer when an audio signal is transmitted simultaneously with the modulated data than when modulated data is transmitted without audio.

In some embodiments, a method of transmitting data in accordance with FIG. 5 further includes processing the modulated data using a high pass filter prior to transmitting the modulated data. The high pass filter has a cut-off frequency that is less than or equal to a lowest frequency of the modulated data. In some cases, transitions between symbols and pauses in the modulated data, in which the sonic carrier signal is switched on or off, result in undesirable transient artefacts appearing in the signal. A sudden switching on or off of a carrier signal (for example a transition having a step-like profile in the time domain) has a Fourier transform with components over a range of frequencies, and these components may impact the data upon demodulation. In an example where data is modulated onto an ultrasonic carrier signal, the high-pass filter may have a cut-off frequency above the audible hearing range, for example about 20 kHz. Therefore, signal artefacts in the audible range will be removed from the signal, and will not be detectable by a human with an average hearing range. In embodiments where data is sent by a playback device that simultaneously performs audio reproduction, this may mitigate or prevent any detrimental effects to the listening experience.

In some embodiments, a header portion is transmitted on a sonic carrier signal, followed by modulated data corresponding to a block of data. Each block of data is therefore preceded by a header portion. A transmitted message may contain one or more blocks of data, each block preceded by a header portion and including a predetermined number of portions of modulated data. A receiving device is able to identify the beginning of a block of data by identifying the header portion preceding the block of data. The header portion has a predetermined duration that is different from the first duration (the duration of each portion of modulated data between pauses). In this way a start of a data transmission can be identified by searching for a received signal having the predetermined header duration. In some examples, the header portion is transmitted continuously, without any pauses or gaps in the sonic carrier signal. In such examples, identifying the header portion involves identifying a period of time in which the sonic carrier signal is continuously transmitted for the predetermined duration of the header portion. In other examples, a header portion may contain sub-portions separated by pauses, where each sub-portion has a different duration to the first duration. Furthermore, pauses between sub-portions of the header may have different durations to the pauses between portions of the data block. In such examples, a receiving device is able to identify a header portion, and hence identify the beginning of a block of data, by detecting this different pattern of transmission and pauses.

In addition to having the predetermined duration, a header portion may contain a predetermined sequence of symbols. A header portion may contain a plurality of symbols, for example two, three or four symbols, where the number of symbols is different to the number of symbols transmitted between pauses in the method of FIG. 5.

In the method of FIG. 5, the modulated block of data has a maximum signal amplitude. In some examples, a header portion comprises at least this maximum signal amplitude when modulated onto the sonic carrier signal. Including the maximum signal amplitude in the header portion allows a receiving device to determine a reference modulated signal amplitude for demodulating the signal. Various configurations of header portions are possible, and particular configurations may be appropriate for particular applications depending on factors such as the size of the associated data block and the method by which the data is encoded and/or modulated. A specific example will be described in more detail below for an example in which data is modulated using 16-QAM.

Figure 6:
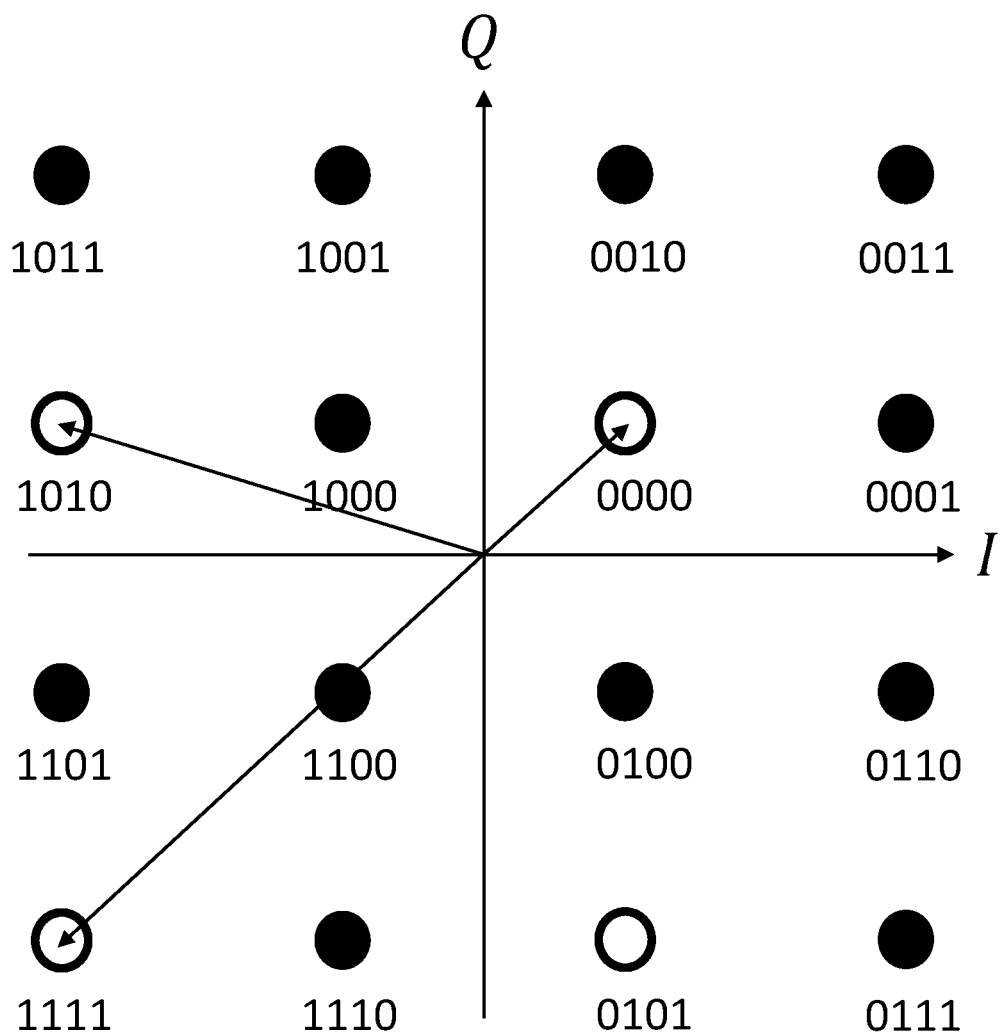
FIG. 6 is a constellation diagram of an example 16-QAM modulation scheme.

FIG. 6 shows a constellation diagram for an example of a 16-QAM modulation scheme. Each possible permutation of four consecutive binary bits is mapped to a point in the I-Q plane (where I is the in-phase component of the modulating signal and Q is the quadrature component of the modulating signal). It is noted that the mapping of FIG. 6 is only an example, other mappings are possible. The phase and magnitude of a vector from the origin to each point in the diagram (in other words, a phasor for each point) corresponds to a phase and amplitude of the modulated sonic carrier signal. Each symbol corresponds to one of the points in the diagram, and hence represents, or conveys, four bits of data. It is observed that, in this example, the sonic carrier signal has three different amplitude states, corresponding to the magnitudes of the three phasors shown as arrows in FIG. 6. A maximum carrier signal amplitude corresponds to one of the four symbols conveying bit sequences 1011, 0011, 1111, 0111 (corresponding to the points furthest from the origin). A minimum carrier signal amplitude corresponds to one of the four symbols conveying bit sequences 1000, 0000, 1100, 0100 (corresponding to the points closest to the origin). An intermediate carrier signal amplitude corresponds to one of the remaining eight symbols. In some embodiments, a header portion may include at least one symbol of each amplitude. For example, using the mapping of FIG. 6, the header portion 111100001010 contains three symbols, one of each possible carrier signal amplitude (corresponding to the three arrows in FIG. 8). In other examples a header portion may include multiple symbols of each amplitude. For example, the header portion 1111000010100101 contains four symbols, two being intermediate amplitude symbols (corresponding to the four empty circles in FIG. 8). The header portion 1111000010100101 includes every combination of amplitudes of the in-phase and quadrature components. A receiving device may use the amplitudes of the signals or the signal components in the header portion to determine reference amplitudes for the modulated data following the header portion.

In addition to being used to identify the beginning of a block of data, and/or determining a reference amplitude for a received signal, a header portion may be used to determine a timing of a received signal, as will be described in more detail hereafter. A header portion may further be used to transmit meta-data for the associated block of data. For example, a header portion may convey data indicating a pattern of transmission and pausing (for example the length of the first duration and the second duration) for the following data portion, which the transmitting device may adjust dynamically. In an embodiment such as that of FIG. 4, in which a playback device transmits data using ultrasonic sound signals, the playback device may use a first pattern of transmission and pausing when audio reproduction is performed simultaneously, and may use a second pattern of transmission and pausing when no audio reproduction is performed simultaneously. A header portion associated with a block of data may include data indicating which pattern will be used for the block, such that a receiving device can process the signal appropriately.

In some embodiments, a tail portion is transmitted on the sonic carrier signal after a block of data. The tail portion has a predetermined duration that is different from the duration of each portion of the modulated data. In some examples, each block of data is transmitted with a header portion and a tail portion. In a further example, a tail portion may only be transmitted at the end of an entire message (which may contain several blocks of data, as discussed above). In this way, messages of varying lengths may be easily identified by a receiving device.

In examples where a header portion and a tail portion are transmitted, the tail portion may have the same duration as the corresponding header portion or a different duration to the corresponding header portion. A tail portion may contain a different sequence of symbols to a corresponding header portion, allowing a receiving device to distinguish the tail portion and the header portion. A tail portion may, for example, contain the reverse bit sequence of the header portion, or may contain the reverse symbol sequence of the header portion. A tail portion may contain at least the maximum signal amplitude of the modulated data block when modulated onto the sonic carrier signal, and may contain every signal amplitude of the modulated data block, or every combination of amplitudes of in-phase and quadrature components. For example, using the symbol mapping of FIG. 6, the tail portion conveying the sequence of bits 1010010100001111 contains at least one symbol of each amplitude, and one symbol for each combination of amplitudes of the in phase and quadrature components. This sequence 1010010100001111 is the reverse bit sequence of the header portion sequence 1111000010100101. The sequence 0101101000001111 is the reverse symbol sequence of the header portion sequence 1111000010100101.

Devices primarily designed for audio reproduction typically use a sample rate of 44.1 kHz or 48 kHz, which are sufficient for reconstructing frequencies of up to 22.05 kHz and 24 kHz respectively, due to the Nyquist-Shannon sampling theorem. However, the reconstructed signal is low-pass filtered with a cut off point below this frequency to reduce the effects of aliasing, so that for example, the reconstructed audio has reduced signal power above about 20 kHz. It has been found that electroacoustic transducers can operate at frequencies above 20 kHz and this allows the use of the band above 20 kHz for data transmission, without needing significant changes to the other electronics in the signal chain, which is designed to operate on data sampled at least at 44.1 kHz. Accordingly, these sampling rates are sufficient for transmitting data using ultrasonic sound signals with frequencies of up to 22.05 kHz and 24 kHz respectively. It will be appreciated that audio formats with sampling rates greater than 48 kHz, such as 92 kHz or 192 kHz may allow greater bandwidth for data transmission in the band above 20 kHz, subject to the ability of the transducer to reproduce those frequencies at the power level required for data transmission.

The rate at which symbols may be transmitted is lower than the frequency of the ultrasonic carrier signal, such that the amplitude and phase of the carrier signal can be correctly recovered for each symbol. In examples, the symbol rate may be between 10 Hz and 100 Hz. Although higher symbol rates may be used, this increases signal-to-noise ratio (SNR) and make demodulation of the signal more challenging. For examples in which QAM-16 modulation is used, the data rate (bit rate) is four times the symbol rate. The data rate may be, for example, between 40 and 400 Hz. It is noted that some devices are capable of high-resolution audio reproduction using higher sampling rates, such as 96 kHz sampling. For such devices, higher carrier signal frequencies may be realised (provided the transducer is capable of generating such signals), and accordingly higher symbol rates and data rates may be achieved.

FIG. 4 shows a receiving device configured to receive data. The receiving device in this example is a smartphone configured for use as a control device 430. The control device 430 has components substantially the same as those of the control device 130*a* shown in FIG. 1H. The control device 430 is configured to receive data according to the method of FIG. 7.

Figure 7:
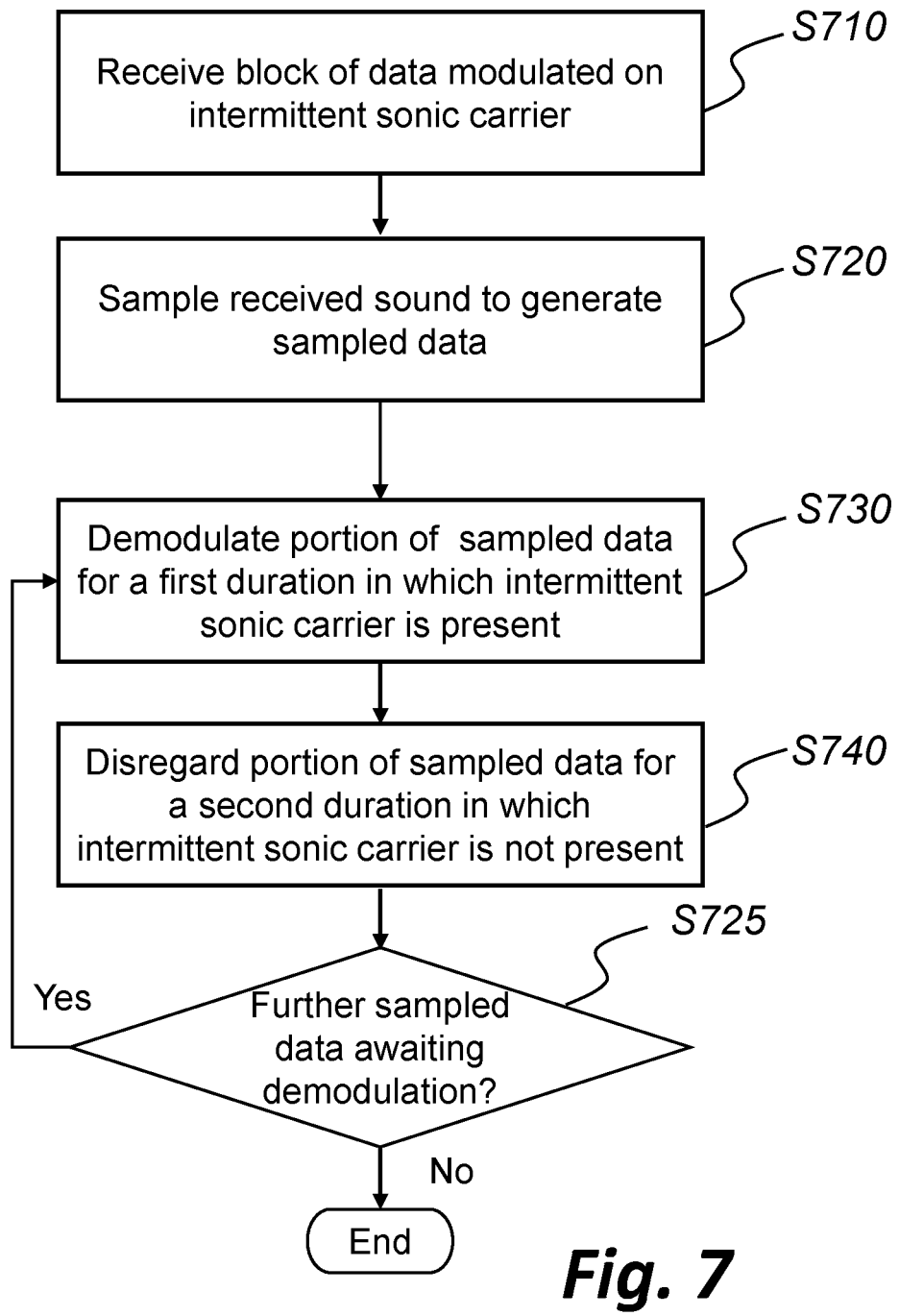
FIG. 7 is a flow chart of a method of receiving data using sound signals.

As shown in FIG. 7, a method of receiving data includes a microphone receiving, at S710, sound containing a block of data modulated on an intermittent carrier signal. The block of data may be modulated according to any suitable modulation scheme, as discussed above with reference to data transmission. In the example of FIG. 4, the playback device 410 modulates data using 16-QAM.

The received sound is sampled, at S720, to generate a sampled data stream. A sampled data stream includes signal values at each of a set of sampling points, where the sampling points are separated based on a predetermined sampling rate (for example, 44.1 kHz or 48 kHz). The sampling rate may be the same as the sampling rate of a device transmitting the block of data. Matching the sampling rates between transmitting and receiving devices is not necessary for the present method to work, as long the receiving sampling rate is at least twice the Nyquist frequency of the modulated data (the Nyquist frequency in this case being the maximum frequency of the modulated data signal).

The sampled data stream is demodulated such that the data can be decoded and further processed. Demodulating the sampled data stream includes demodulating, at S730, a portion of the sampled data stream corresponding to a first duration in which the intermittent ultrasonic carrier signal is present, and then disregarding, at S740, a portion of the sampled data stream corresponding to a second duration in which the intermittent ultrasonic carrier signal is not present. In the example of data modulated using a QAM modulation scheme, demodulating each portion of the sampled data stream involves multiplication of the portion by cosine and sine signals and lowpass filtering the results to recover baseband I and Q values. The baseband I and Q values correspond to symbols, each encoding a predetermined number of data bits in accordance with a mapping such as that of FIG. 6.

It is then determined at step S750 whether further data is awaiting demodulation. If there is further data the demodulating at S730 and disregarding at S740 are repeated.

As discussed above, portions of the sampled data stream that correspond to pauses in transmission of the sonic carrier signal are disregarded. In some examples, a receiving device may detect such portions of the sampled data stream before or during the demodulation process, for example by determining that the amplitude of the sonic carrier signal is close to zero. In other examples, a receiving device may use header and/or tail portions in the received sound signal to determine which portions of the data stream to disregard. This approach may result in reduced processing by the receiving device, as minimal processing is required for the portions of the data stream determined to be disregarded.

Figure 8:
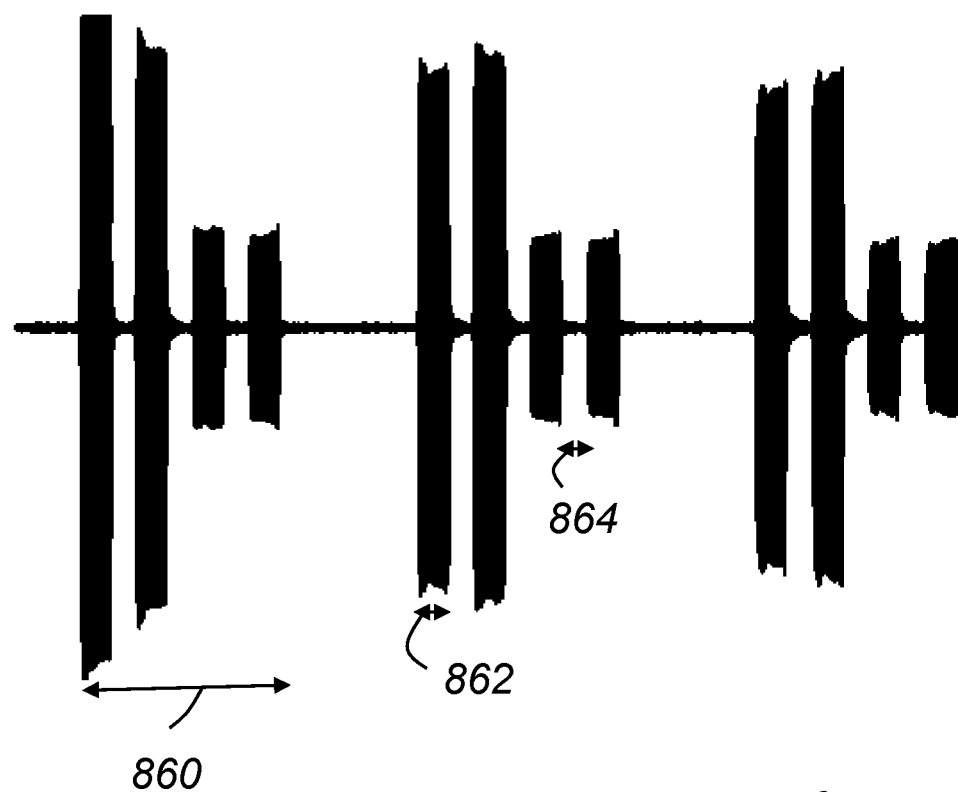
FIG. 8 shows a waveform of an example received sound transmitted using the method of FIG. 5.

FIG. 8 shows a waveform of an example received sound signal transmitted using the method of FIG. 5. The received signal contains three blocks of data 860, each block including four symbols 862. The symbols in each block are separated by a pause 864 having a duration equal to one symbol. In this example, no header portion or tail portion is transmitted for purposes of illustration, and each of block of data is the same to demonstrate the repeatable nature of the data transmission.

Figure 9:
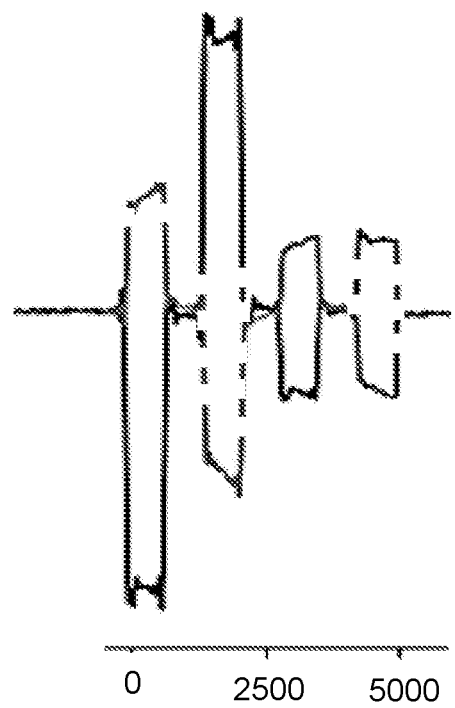
FIG. 9 shows the in-phase and quadrature components of a demodulated sound signal waveform from FIG. 8.

FIG. 9 shows in phase and quadrature components for a demodulated sound signal waveform from FIG. 8, containing four 16-QAM symbols, where the four symbols are separated by a pause having an equal duration to one symbol. The solid line represents the in phase components, and the dashed line represents the quadrature components. The horizontal axis depicts the sample numbers from data sampled at a rate of 44.1 kHz in this example. The symbol rate is 40 Hz, corresponding to a data rate of 160 Hz. Using the mapping of symbols shown in FIG. 6, the demodulated data block conveys the bit sequence 1010011010000100.

In some embodiments, a method of receiving data in accordance with FIG. 7 further includes processing the received sound with a high pass filter before sampling the received sound. The high pass filter has a cut-off frequency that is less than or equal to a lowest frequency of the expected sonic carrier signal, for example less than about 20 kHz. In some cases, transitions in which the sonic carrier signal is switched on or off result in undesirable transient artefacts being present in the signal. These artefacts may originate during transmission of the data signal, as described above, or may originate at the receiver. In either case, the data within the signal received by the electronics of the receiving device may be obscured by such artefacts. Processing the received sound with a high-pass filter may reduce such artefacts, improving the reliability of demodulation of the sampled data stream. In an example where data is modulated onto an ultrasonic carrier signal, a high pass filter may also be used to extract the ultrasonic signal from audible background sound, for example sound generated by audio reproduction by one or more playback devices.

As discussed above, in some embodiments a block of data modulated onto a sonic carrier signal is preceded by a header portion having a predetermined duration which is different from the duration of each portion of data transmitted between pauses in the sonic carrier signal. Accordingly, a receiver device performing the method of FIG. 7 may detect a header portion in the received sound, for example by detecting a continuous transmission of the sonic carrier having the predetermined duration of a header portion. The receiver device may use the header portion to identify the beginning of a block of data. Identifying the beginning of a block of data by detecting a header portion results in a coarse estimate of a timing of the block of data. A coarse timing estimate may be accurate, for example, to within a fraction of a symbol, for example a fifth or a tenth of a symbol. The header portion may further be used to determine a fine timing estimate of the block of data. A fine timing estimate may be accurate to within the duration of a few samples or the interval between individual samples. For example, a header portion may include a predetermined sequence of symbols. By performing a cross-correlation between a received header portion and the predetermined sequence of symbols for a set of candidate timing offsets, a fine timing may be determined, corresponding to the candidate timing offset giving a maximum value of the cross-correlation. Determining a fine timing estimate of a block of data may allow the data to be demodulated and decoded more accurately than if only a coarse timing estimate is used.

In some embodiments, receiving a block of data includes processing a header portion to determine a reference modulated signal value. The reference signal value may be an amplitude. Determining a reference signal amplitude may be necessary for examples where data is modulated using a modulation scheme involving amplitude modulation, for example QAM or ASK. A header portion may, for example, contain at least a maximum signal amplitude of the modulated signal. Determining a maximum signal amplitude may involve determining the maximum signal amplitude in the received header portion. In other examples, a header portion may include every signal amplitude within a modulated signal, for example as discussed above with reference to FIG. 6. In this case, more than one reference signal amplitude may be determined, for example by measuring the signal amplitudes for different symbols in the header portion.

In addition to being preceded by a header portion, a block of data may be followed by a tail portion. In addition to, or as an alternative to, detecting a header portion, the receiving device may detect a tail portion in the received sound. In some examples, a receiving device may use the tail portion to identify the end of a block of data. In some examples, a tail portion may only be transmitted at the end of an entire message (which may contain several blocks of data, as discussed above). A receiving device may then be able to identify individual messages of arbitrary length.

The tail portion may be used to determine coarse and fine timing estimates of the block of data, in a similar manner to the header portion described above. By combining the estimates determined using the header and the tail respectively (for example, by taking an average such as an arithmetic mean), a more accurate estimate of the timing of the block of data may be determined. Similarly, the tail portion may be used to determine one or more reference modulated signal values. By combining the reference signal values determined using the header portion and the tail portion, a more accurate reference signal value may be determined. Further, if the reference signal value changes between the header and tail portions, an interpolated varying reference signal value may be determined for the block of data. For example, a linearly-varying reference signal value may be assumed.

The methods described above may be used to transfer data between devices using sound signals. In the embodiment of FIG. 4, a playback device 410 transfers data to a receiving device, which in this example is a control device 430 similar to that discussed above with reference to FIG. 1H, and is connected via a network to a playback system containing the playback device 410. In the illustrated example, a listener 403 holding control device 430 walks into the room 401 in which the playback device 410 is located. The playback device 410 is configured to transmit data blocks corresponding to an acoustic identifier of the playback device 410, using the method described above with reference to FIG. 5. In this example, an acoustic identifier is a sequence of symbols associated with the playback device 410 which allows a receiving device to identify the playback device 410. In this example, the playback device 410 is configured to transmit the acoustic identifier at regular intervals, though in other examples, a playback device may be configured to transmit an acoustic identifier based on a trigger event, for example when the playback device is switched on, or in response to receiving a control signal from a control device.

An acoustic identifier may be transmitted in a single block, or may be transmitted in several blocks. A playback device may have a predetermined acoustic identifier, for example a unique predetermined acoustic identifier that is different from an acoustic identifier of any other playback device. Alternatively, a playback device may have an acoustic identifier that is assigned dynamically, for example to ensure that playback devices in a playback system have different acoustic identifiers. An acoustic identifier of a playback device may therefore change as a configuration of the playback system changes. A dynamically-assigned acoustic identifier may be assigned automatically by a computing system associated with a playback system. Dynamic allocation of acoustic identifiers allows for acoustic identifiers to be shorter in comparison with unique predetermined acoustic identifiers, which may be advantageous in terms of reliability and efficiency of transmitting and receiving the acoustic identifiers.

An acoustic identifier can be used to identify a playback device, a playback zone containing the playback device, and/or a zone group of the playback zone containing the playback device. In some examples, playback devices within the same playback zone and/or zone group may transmit the same acoustic identifier. Playback devices within a playback zone and/or zone group may transmit the same acoustic identifier in synchrony, or asynchronously. In some examples, a subset of playback devices within a playback zone and/or zone group may transmit an acoustic identifier. In further examples, two or more playback devices may be bonded or paired to form a consolidated player or a bonded player, as described in detail above with reference to FIGS. 1I-1K. In such cases, one or more of the bonded or paired playback devices may be arranged to transmit an acoustic identifier for the bonded or consolidated player. In some examples, two or more of the bonded or paired playback devices may take turns to transmit an acoustic identifier. If the acoustic identifiers are transmitted frequently, taking turns to transmit an acoustic identifier may mitigate any detrimental effects to the playback devices or the audio reproduction by the playback devices, for example caused by an accumulation of thermal energy in transducers of the playback devices.

The control device 430 receives the acoustic identifier using the method described above with reference to FIG. 7. The control device 430 may be configured to perform various actions in response to receiving the acoustic identifier from the playback device 410. For example, the control device 430 may display a user interface associated with the playback device 410, or a playback zone or zone group containing the playback device 410, such that the listener 403 is able to control audio reproduction by the playback device 410. As the listener 403 walks from room to room, the control device 430 may automatically update the user interface to indicate that the listener 403 has entered a region associated with a new playback device, playback zone, or zone group, such that the listener 403 is able to control audio reproduction in whichever room the listener 403 is currently located in.

Other forms of data may also be transferred between the playback device 410 and the control device 430 using the methods of FIGS. 5 and 7. For example, the data may comprise authentication information for a playback system comprising the playback device 410, which may then be used by the control device 430 to join a network of the playback system. The use of a sonic channel to transmit the data may allow the data to be received over the sonic channel while the control device remains connected to another network than that used by the playback system or may allow security to be enhanced by the use of additional communication channels.

Figure 10:
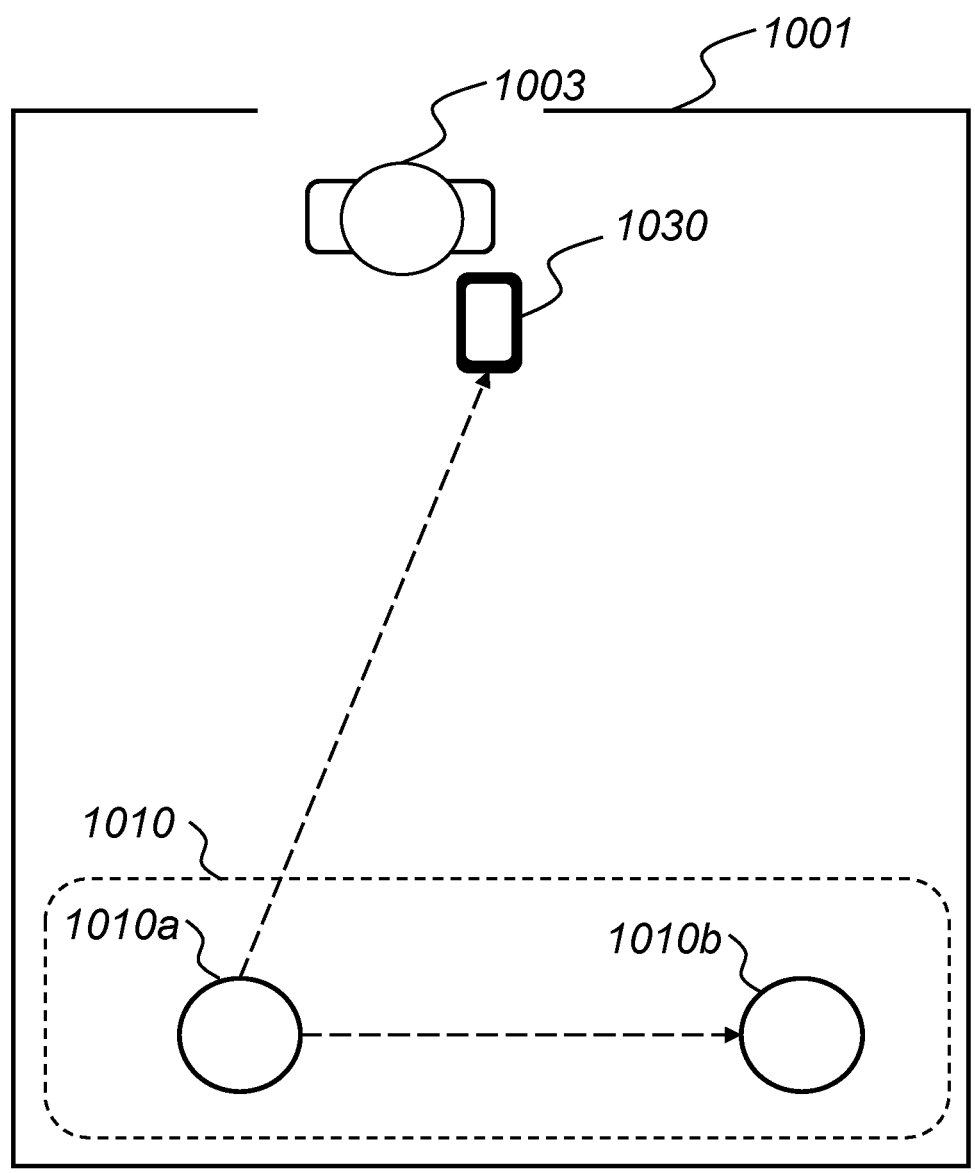
FIG. 10 is a schematic diagram of data transfer between playback devices during a setup process.

FIG. 10 shows an example in which a first playback device 1010a transfers data to a second playback device 1010b during a setup process. In this example, the first playback device 1010a and the second playback device 1010b are connected via a network to form part of a playback system, but are initially not paired. The first playback device 1010a is placed in a setup mode, for example by a user 1003 of a control device 1030. The second playback device 1010b is placed in a receiving mode in which the second playback device 1010b listens for data-conveying sound signals. The first playback device 1010a sends data using the method of FIG. 5, indicating that the first playback device 1010a is ready to pair. In this example, the data transmitted by the first playback device 1010a includes an acoustic identifier of the first playback device 1010a. The second playback device 1010b receives the data using the method of FIG. 7. In response to receiving the data from the first playback device 1010a, the second playback device 1010b sends a message to the first playback device 1010a via the network (or alternatively, via a further sound signal), using the acoustic identifier received from the first playback device 1010a to identify the first playback device 1010a, and enters a pairing mode with the first playback device 1010a.

Once the first playback device 1010a and the second playback device 1010b have entered a pairing mode, the pairing or bonding of the first playback device 1010a and the second playback device 1010b is configurable, for example by the user 1003 of the control device 1030. In this example, the first playback device 1010a and the second playback device 1010b are to be configured as a stereo pair, with the first playback device 1010a as a right speaker and the second playback device 1010b as a left speaker. It will be appreciated that other configurations are possible, for example the two playback devices may be configured as a consolidated player.

Methods such as that described with reference to FIG. 10 may be performed by multiple playback devices, for example resulting in automatic formation of new playback zones and/or new bonded or consolidated playback devices. In some examples, certain models of playback device are configured to be paired in a default configuration, for example if a first playback device is designed for relatively low-frequency audio reproduction (for example, a playback device containing a subwoofer) and a second playback device is designed for relatively high-frequency audio reproduction (for example, a playback device containing a woofer and/or a tweeter). In such an example, receipt of setup data from the first playback device by the second playback device may cause the second playback device to automatically pair with the first playback device, forming a bonded playback device in the default configuration.

In another example, a playback device may transmit data to a receiving device using the methods described herein to indicate the nature of a hardware fault or other type of technical fault. Known types of fault may each be assigned a unique fault code that can be transmitted by the playback device. For example, a playback device may detect a hardware fault and enter a fault mode. The playback device may indicate that it has entered the fault mode, for example, by illuminating a dedicated light, or changing a color of a light on the playback device. Alternatively, a playback device may indicate that it has entered a fault mode using an audible signal, for example a beeping sound. On noticing that the playback device has entered a fault mode, a user of a receiving device (for example, a smartphone, tablet or laptop computer) may connect to a technical support service, for example using a voice call, using a dedicated application, or via a user interface of a more general application associated with the playback device. The received data may be demodulated and decoded by the receiving device, or by the technical support service. The receiving device or the technical support service may determine the nature of the hardware fault from the demodulated and decoded data. Depending on the nature of the fault, the receiving device or technical support service may provide instructions to the user to remedy the fault, or alternatively connect the user to an appropriate member of a technical support team. Transmission of data indicating the nature of a technical fault as described may negate the need for a human user to describe the fault to a person, thus saving time for the user and the technical support service, as well as increasing reliability by ensuring that a fault is not detected erroneously. This may allow data of a fault to be transmitted when the fault means that a network interface of the device experiencing the fault is inoperable or operating erroneously, which can be useful when a device has a limited user interface to indicate the nature of the fault.

IV. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A method of transmitting data, the method comprising:
encoding a block of data into a plurality of symbols to be transmitted;
modulating the symbols onto an ultrasonic carrier signal to generate modulated data, the modulated data including a first subset and a second subset;
transmitting, using an electroacoustic transducer, the first and second subsets of the modulated data, wherein the first subset of the modulated data is transmitted while the electroacoustic transducer is outputting an audible signal, and the second subset of the modulated data is transmitted while the electroacoustic transducer is not outputting the audible signal, and wherein the first and second subsets are transmitted by:
transmitting a portion of the first or second subset of the modulated data for a first duration;
pausing transmission for a variable second duration, wherein the variable second duration is longer when transmitting the first subset of the modulated data, and is shorter when transmitting the second subset of the modulated data, and wherein the variable second duration is based on a characteristic of the electroacoustic transducer; and
repeating the transmitting and pausing with further portions of the first or second subset of the modulated data.

2. The method of claim 1, comprising processing the modulated data using a high pass filter prior to transmitting the first and second subsets of the modulated data, wherein the high pass filter has a cut-off frequency less than or equal to a lowest frequency of the modulated data.

3. The method of claim 1, comprising transmitting a header portion before transmitting the first and second subsets of the modulated data, the header portion having a predetermined duration which is different from the first duration.

4. The method of claim 3, wherein the modulated data has a maximum signal amplitude, and wherein the header portion comprises at least the maximum signal amplitude when modulated onto the ultrasonic carrier signal.

5. The method of claim 1, comprising transmitting a tail portion after transmitting the first and second subsets of the modulated data, the tail portion having a predetermined duration which is different from the first duration.

6. The method of claim 1, wherein the first duration corresponds to a duration of one symbol in the modulated data.

7. The method of claim 1, wherein the variable second duration is based on a product model incorporating the electroacoustic transducer.

8. The method of claim 1, wherein the symbol rate is between 10 and 100 Hz.

9. The method of claim 1, comprising modulating the symbols using quadrature amplitude modulation (QAM).

10. A playback device comprising:
an electroacoustic transducer for generating audio signals;
non-transitory storage comprising program code; and
a processing system;
wherein the program code, when executed by the processing system, causes the playback device to:
encode a block of data to be transmitted into a plurality of symbols to be transmitted;
modulate the symbols onto an ultrasonic carrier signal to generate modulated data, the modulated data including a first subset and a second subset;
transmit, using the electroacoustic transducer, the first and second subsets of the modulated data, wherein the first subset of the modulated data is transmitted while the electroacoustic transducer is outputting an audible signal, and the second subset of the modulated data is transmitted while the electroacoustic transducer is not outputting the audible signal, and wherein the first and second subsets are transmitted by:
transmitting a portion of the first or second subset of the modulated data for a first duration;
pausing transmission for a variable second duration, wherein the variable second duration is longer when transmitting the first subset of the modulated data, and is shorter when transmitting the second subset of the modulated data, and wherein the variable second duration is base on a characteristic of the electroacoustic transducer; and
repeating the transmitting and pausing with further portions of the first or second subset of the modulated data.

11. The playback device of claim 10, comprising:
a microphone; and
an analog to digital convertor;
wherein the program code, when executed by the processing system, causes the playback device to:
receive sound using the microphone, the received sound comprising a second block of data modulated on an intermittent ultrasonic carrier signal and transmitted by another device;
sample the received sound to generate a sampled data stream using the analog to digital converter; and
demodulate the sampled data stream by:
demodulating a portion of the sampled data stream corresponding to a first duration in which the intermittent ultrasonic carrier signal is present;
disregarding a portion of the sampled data stream corresponding to a second duration in which the intermittent ultrasonic carrier signal is not present; and
repeating the steps of demodulating and discarding to demodulate further portions of the sampled data stream.

12. The method of claim 1, wherein the electroacoustic transducer is part of a playback device configured to perform audio reproduction.

13. The method of claim 12, wherein the modulated data includes an acoustic identifier assigned to the playback device.

14. The method of claim 12, wherein the modulated data includes setup data configured to pair the playback device with at least one other playback device.

15. The method of claim 1, wherein the audible signal includes media content.

16. The method of claim 2, wherein the cut-off frequency of the high pass filter is above a human audible hearing range.

17. The method of claim 1, wherein the variable second duration is configured to mitigate heating of the electroacoustic transducer.

* * * * *

UNITED STATES PATENT AND TRADEMARK OFFICE
CERTIFICATE OF CORRECTION

PATENT NO. : 11,514,777 B2
APPLICATION NO. : 16/150060
DATED : November 29, 2022
INVENTOR(S) : Eric Frank It is certified that error appears in the above-identified patent and that said Letters Patent is hereby corrected as shown below:

In the Claims

In Column 36, in Claim 10, Line 2, delete "base" and insert -- based --, therefor.

Signed and Sealed this
Tenth Day of January, 2023

Katherine Kelly Vidal
*Director of the United States Patent and Trademark Office*